United States Patent
Herman et al.

(10) Patent No.: US 7,761,262 B2
(45) Date of Patent: Jul. 20, 2010

(54) METHOD AND SYSTEM FOR IMPLEMENTING A TRAINING FACILITY

(75) Inventors: Glen A. Herman, Olathe, KS (US); Juan A. Uribe, Kansas City, MO (US); David Stukesbary, Kansas City, MO (US)

(73) Assignee: HNTB Corporation, Kansas City, MO (US)

( * ) Notice: Subject to any disclaimer, the term of this patent is extended or adjusted under 35 U.S.C. 154(b) by 1570 days.

(21) Appl. No.: 11/045,711

(22) Filed: Jan. 28, 2005

(65) Prior Publication Data

US 2005/0272011 A1 Dec. 8, 2005

Related U.S. Application Data

(60) Provisional application No. 60/539,893, filed on Jan. 28, 2004, provisional application No. 60/569,754, filed on May 10, 2004.

(51) Int. Cl.
G06F 17/50 (2006.01)
(52) U.S. Cl. .......................... 703/1; 345/419
(58) Field of Classification Search ............ 703/1
See application file for complete search history.

(56) References Cited

U.S. PATENT DOCUMENTS 5,823,780 A * 10/1998 Arye et al. ............... 434/38
7,155,158 B1 * 12/2006 Iuppa et al. .............. 434/350
7,324,102 B2 * 1/2008 Inzinga et al. ............ 345/419

OTHER PUBLICATIONS

Marlatt et al, "Video Simulation for Training Land Design and Management", US Army Corps of Engineers Construction Engineering Research Laboratories Technical Report 95/21, Aug. 1995.*
Khattak et al, "An Application of Lidar Technology to Highway Safety", Transportation Research Board Annual Meeting, Washington DC, Jan. 12-16, 2003.*
MIL-HDBK-1027/3B, "Range Facilities and Miscellaneous Training Facilities Other than Buildings", Nov. 30, 1992.*
Childs et al, "A Battalion/Brigade Training Simulation", Proceedings of the 19th Conference on Winter Simulation, pp. 876-885, Atlanta Georgia, 1987.*

(Continued)

*Primary Examiner*—Paul L Rodriguez
*Assistant Examiner*—Mary C Jacob
(74) *Attorney, Agent, or Firm*—Shook, Hardy & Bacon LLP

(57) ABSTRACT

Methods for implementing a training facility, e.g., a military or law enforcement training facility, for a geographic location having at least one proposed observer position, e.g., a firing position, and at least one proposed target position are provided. In one embodiment, the method includes receiving design data (for instance, a digital terrain model) indicative of the geographic location, receiving data indicative of the proposed observer position and the proposed target position, applying the data indicative of the proposed observer position and the proposed target position to the design data creating modified design data, and conducting a line-of-sight analysis of the modified design data between the proposed observer position and the proposed target position.

21 Claims, 37 Drawing Sheets

OTHER PUBLICATIONS

Su, Zhitao, "Development of GIS as an Information Management System: A Case Study for the Burden Center", Thesis, Louisiana State University, Agricultural and Mechanical College, Aug. 2003.*

Franklin et al, "Geometric Algorithms for Siting of Air Defense Missile Batteries", Battelle, Columbus Division, Scientific Services Program, Mar. 31, 1994.*

Vargas, Clark, "Design Criteria for Shooting Ranges", Third National Shooting Range Symposium, 1996.*

ESRI, "The Range Managers Toolkit: Automating the Surface Danger Zone Process with the SDZTool", Mil Intel Muster, Summer 2004, pp. 4-5.*

Hathcock et al, "ArcGIS Server Solutions for Ranges Safety in the USMC", ESRI 2005 International User Conference Proceedings, 2005.*

Surface Danger Zone Tool User Manual, Jan. 2, 2003, pp. 1-136.*

* cited by examiner

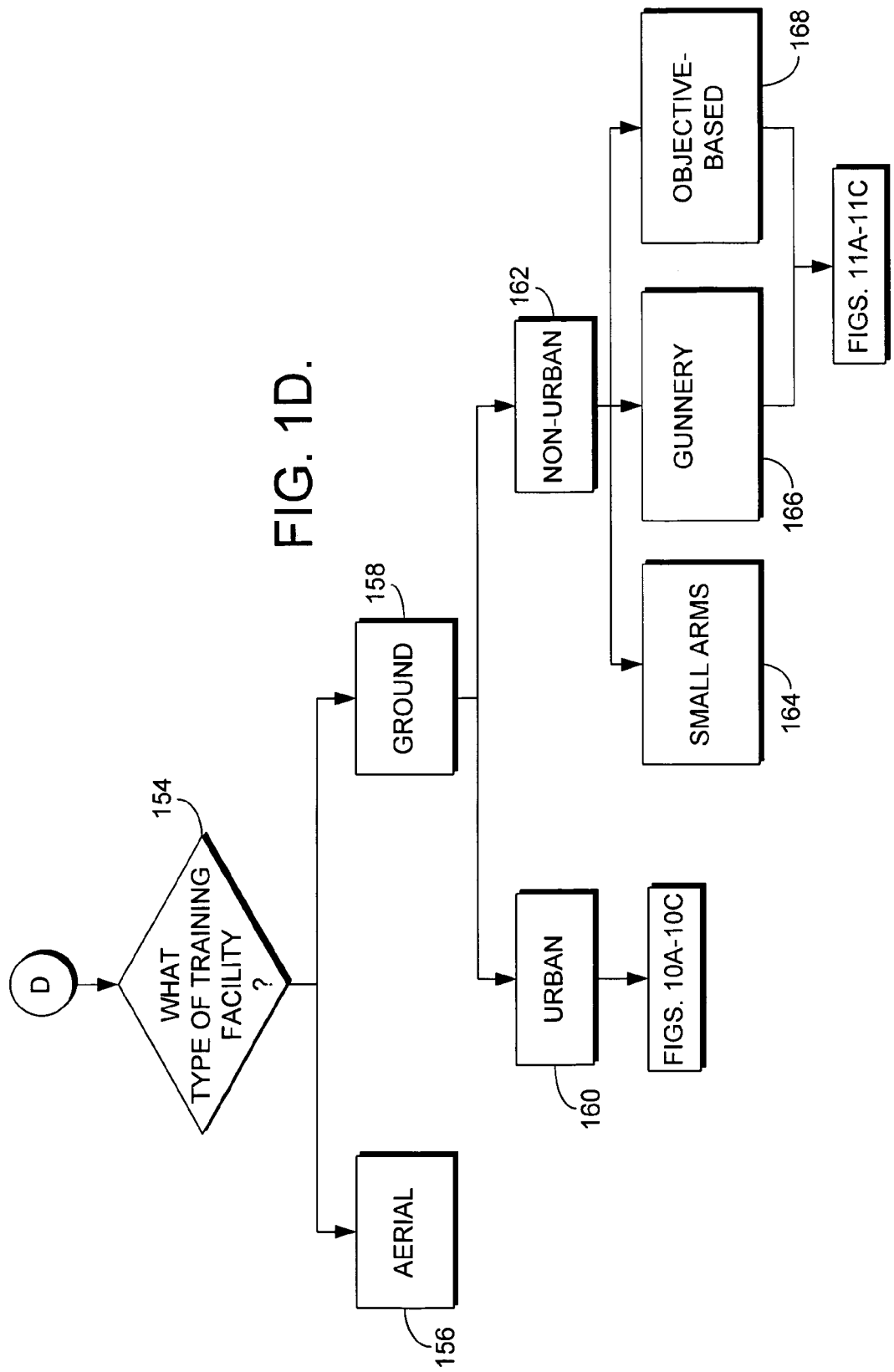

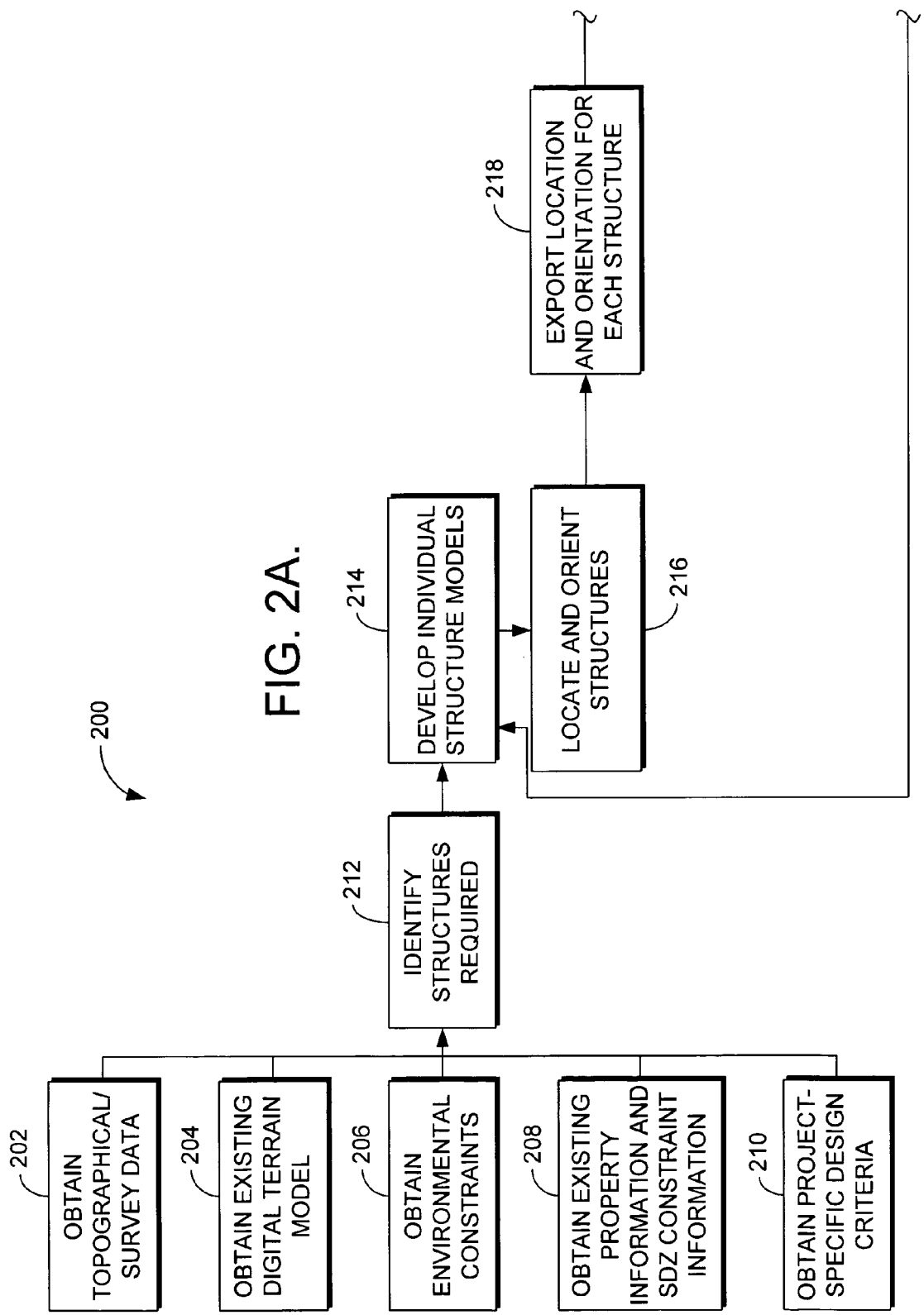

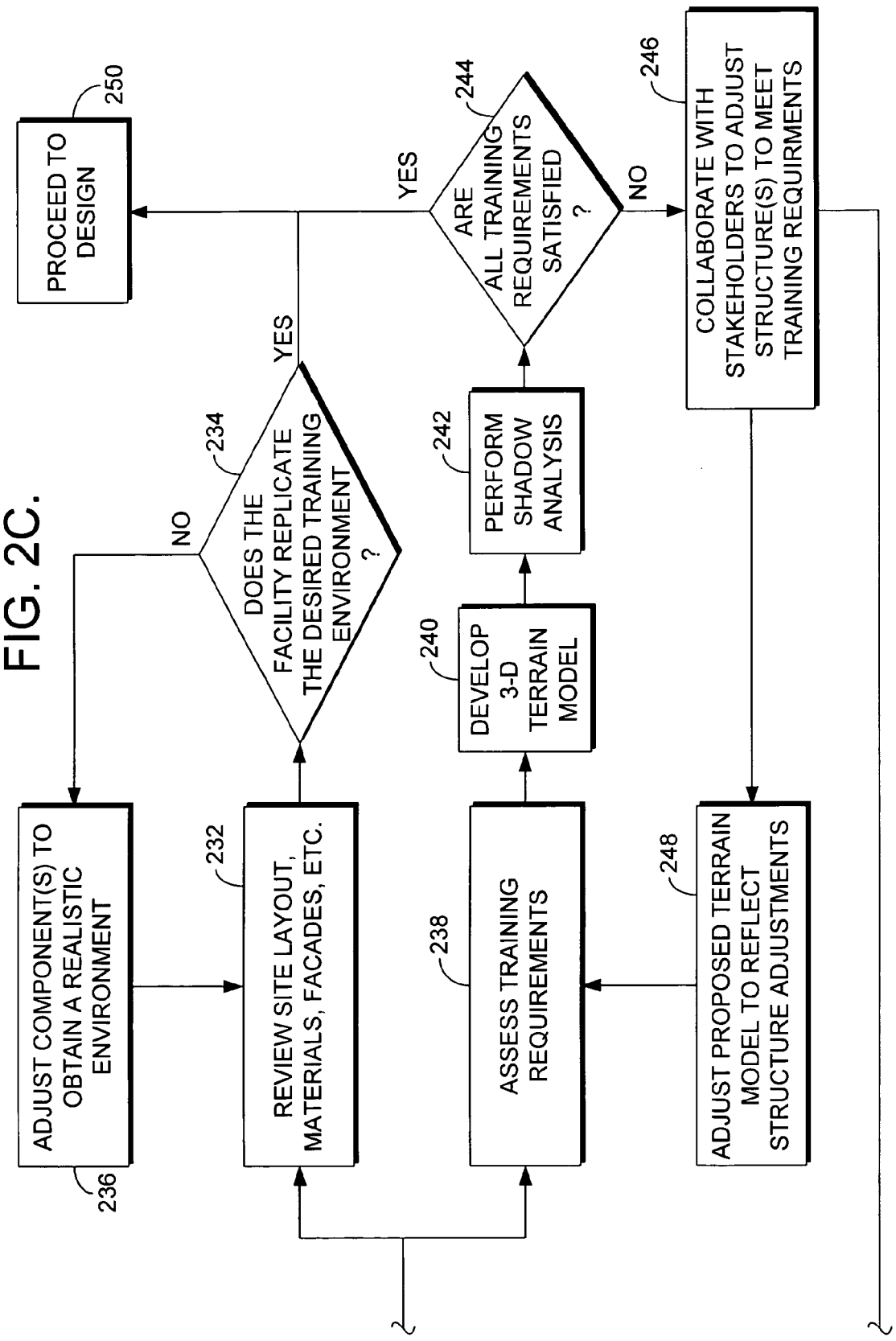

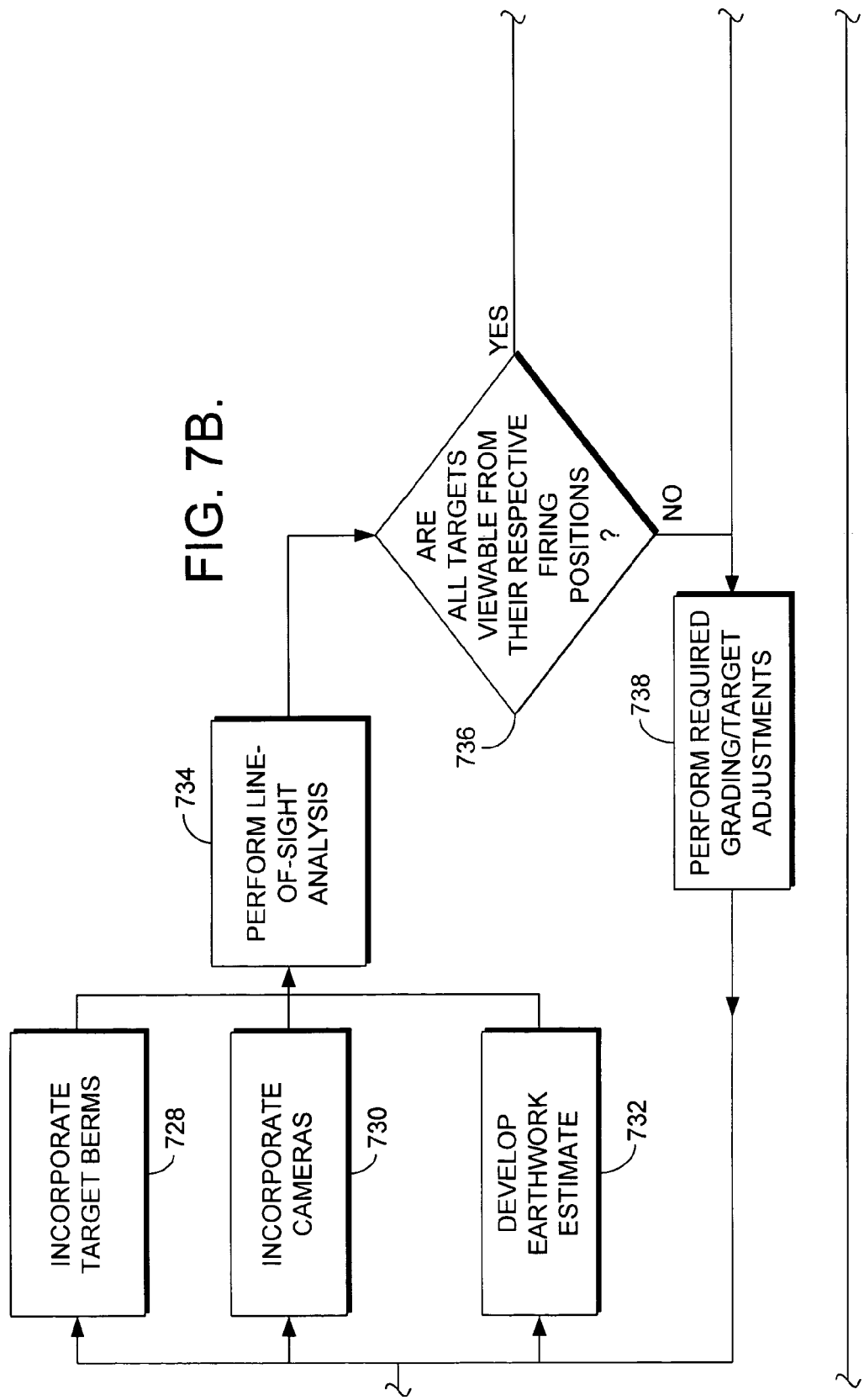

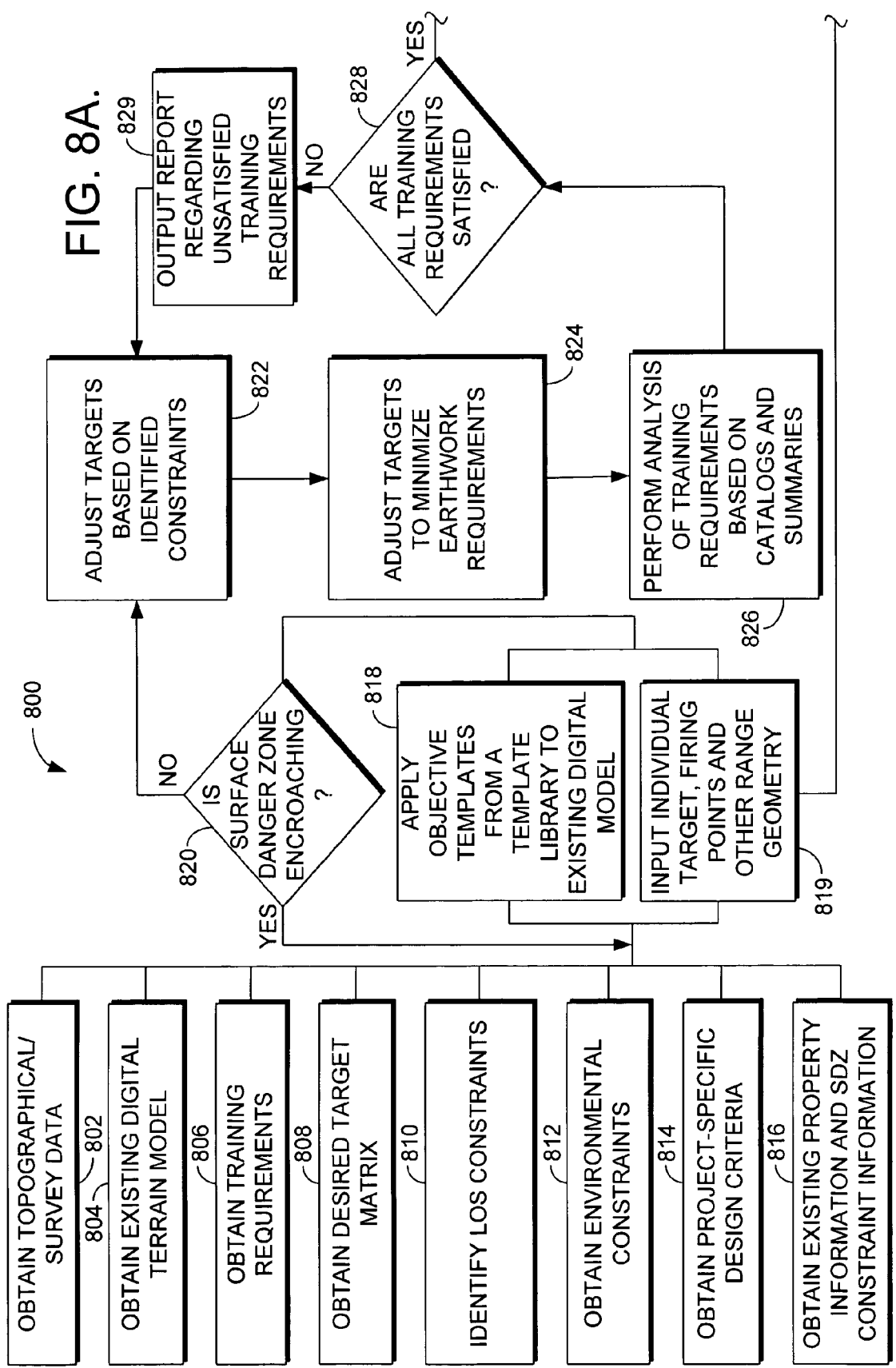

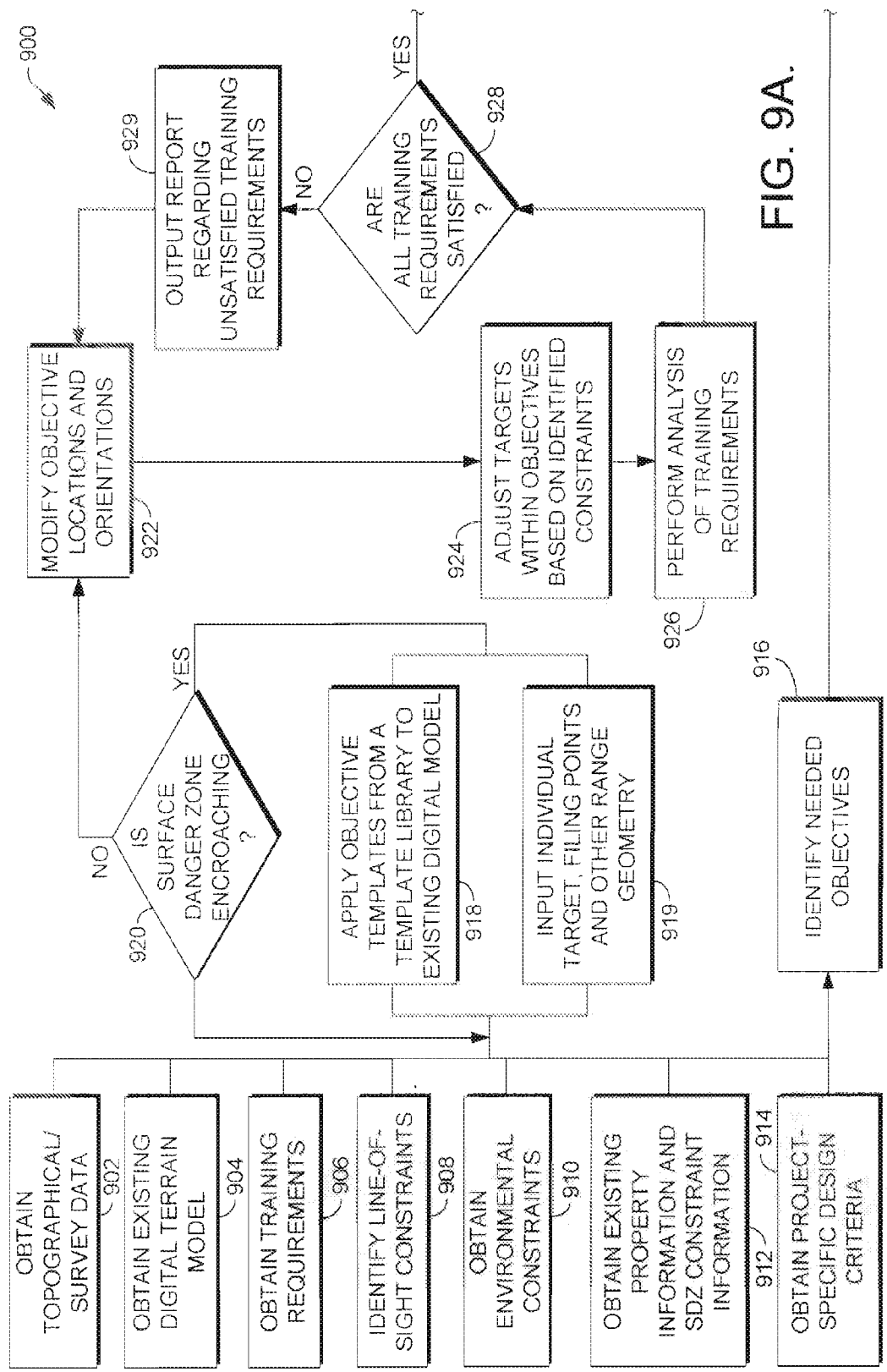

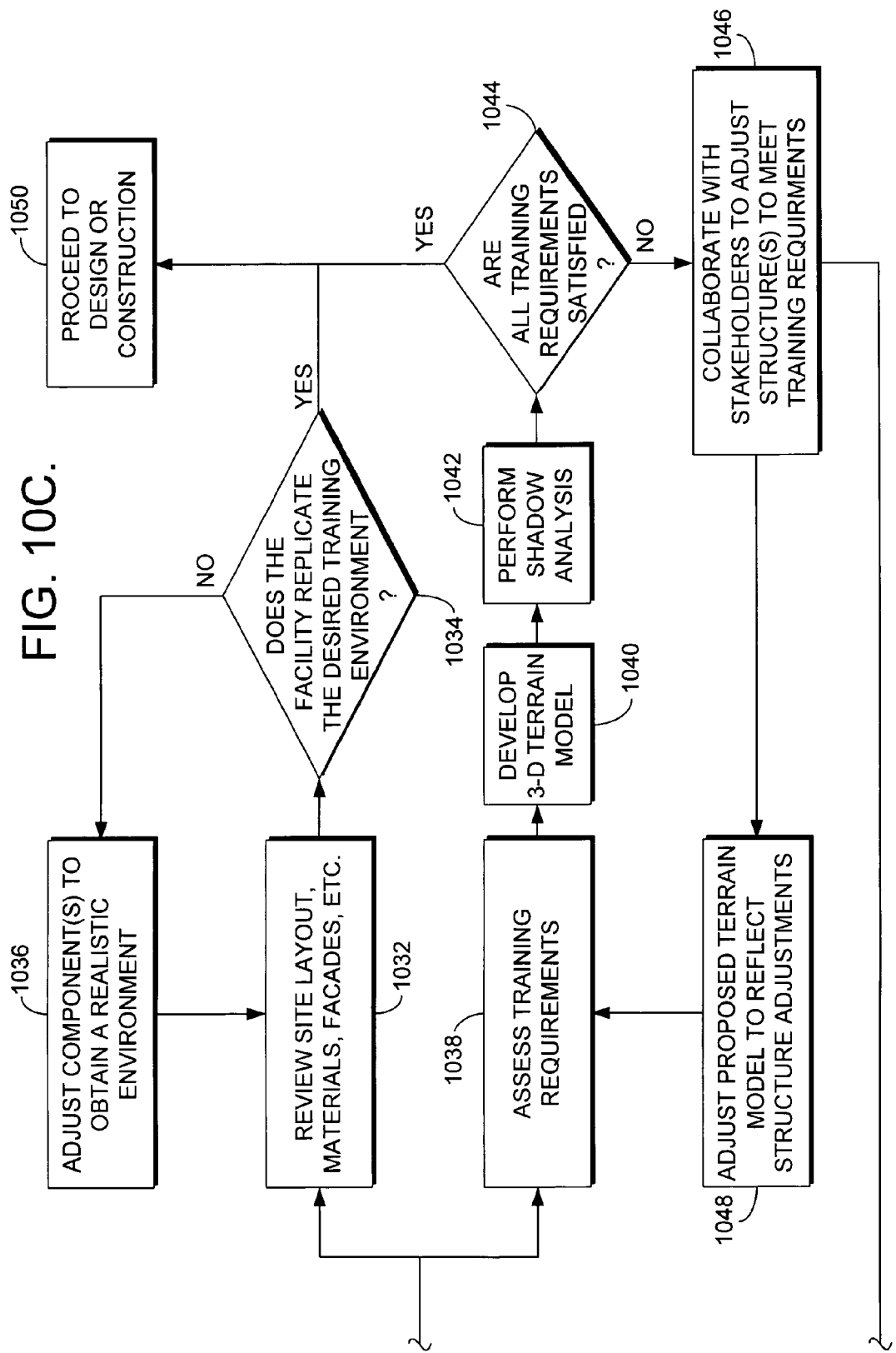

METHOD AND SYSTEM FOR IMPLEMENTING A TRAINING FACILITY

CROSS-REFERENCE TO RELATED APPLICATIONS

This application claims the benefit of U.S. Provisional Application No. 60/539,893, filed Jan. 28, 2004, and U.S. Provisional Application No. 60/569,754, filed May 10, 2004.

STATEMENT REGARDING FEDERALLY SPONSORED RESEARCH OR DEVELOPMENT

Not Applicable.

TECHNICAL FIELD

The present invention relates to implementation of training facilities, e.g., military and/or law enforcement training facilities. More particularly, the present invention relates to a method and system for implementing a training facility throughout various phases including one or more of a planning phase, a design phase, a review phase, a construction phase, and an operations phase. In various embodiments, the method and system of the present invention may include one or more of line-of-sight (LOS) analysis, berm incorporation and design visualization and/or simulation, including operations and training.

BACKGROUND OF THE INVENTION

In general, training facilities, e.g., military and/or law enforcement training facilities, are areas utilized to prepare personnel (for instance, military personnel) to meet mission requirements. Training facility implementation, in part, includes ensuring that line-of-sight (LOS) is available between various positions within the facility, for instance, between an observer or firing position and a target position. Implementation of training facilities, from planning through operations, is typically a slow and laborious process. This is largely because line-of-sight is difficult to verify as it is typically done one profile at a time, that is, between one observer position and one target position at a time, by visual inspection. Line-of-sight becomes particularly difficult to verify when the observer and/or target are not static but are moving, e.g., are pop-ups or are on rails. An additional challenge is to look at the capability of the range to meet a specific training need since it looks at specific sets of firing position to target position combinations with specific characteristics including types of targets, distances, and type of firing position.

Additionally, training facility implementation does not permit visualization of the training facility prior to construction being well under way. This is because such visualization is primarily manual, visual inspection of the facility after construction has commenced. Training facility implementation is also an expensive proposition and, oftentimes, the money spent on a training facility is largely wasted if line-of-sight cannot be achieved and/or training requirements cannot be satisfied and such failures are not discovered until a manual, visual inspection takes place.

Accordingly, a method and system for improving line-of-sight efficiency would be desirable. Additionally, a method and system for training facility implementation which permits visualization and/or simulation of the facility prior to construction being commenced would be advantageous. Still further, a system which examines the training facility of a group of targets and firing positions would be desirable.

BRIEF SUMMARY OF THE INVENTION

In one aspect, the present invention relates to methods for implementing a training facility, e.g., a military or law enforcement training facility, for a geographic location having at least one proposed observer position, e.g., a firing position, and at least one proposed target position. In one embodiment, the method includes receiving design data (for instance, a digital terrain model) indicative of the geographic location, receiving data indicative of the proposed observer position and the proposed target position, applying the data indicative of the proposed observer position and the proposed target position to the design data creating modified design data, and conducting a line-of-sight (LOS) analysis of the modified design data between the proposed observer position and the proposed target position. If desired, the line-of-sight analysis may be conducted during a training facility planning phase, a training facility design phase, a training facility review phase, a training facility construction phase, and/or a training facility operations and training phase.

In another aspect, the present invention relates to methods for planning a training facility, e.g., a military or law enforcement training facility, for a geographic location having at least one proposed observer position, e.g., a firing position, and at least one proposed target position. In one embodiment, the method includes receiving design data (e.g., a digital terrain model) indicative of the geographic location, receiving data indicative of the proposed observer position and the proposed target position, applying the data indicative of the proposed observer position and the proposed target position to the design data creating modified design data, and importing the modified design data into a design visualization and/or simulation tool. The design visualization and/or simulation tool receives input relating to the modified design data and outputs an accurate representation of the training facility topography, vegetation, targetry, and camera locations, as applicable. In this way, a visual verification that all training requirements are satisfied is provided prior to construction being commenced.

In a further aspect, the present invention relates to methods for designing or reviewing a training facility, e.g., a military or law enforcemnt training facility, for a geographic location having at least one proposed observer position (for instance, a firing position) and at least one proposed target position. In one embodiment the method includes receiving design data (e.g., a digital terrain model) indicative of the geographic location, receiving data indicative of the proposed observer position and the proposed target position, applying the data indicative of the at least one proposed observer position and the at least one proposed target position to the design data creating modified design data, conducting a line-of-sight analysis of the modified design data between the at least one proposed observer position and the at least one proposed target position, and outputting results of the line-of-sight analysis.

In an additional aspect, the present invention relates to methods, in a computing environment, for performing a line-of-sight analysis between a first position and a second position. In one embodiment, the method includes receiving design data representative of a geographic location, e.g., a digital terrain model, receiving data indicative of the first position and the second position, generating a first path between the first and second positions, projecting the first path onto the design data to generate a first profile, receiving at least one line-of-sight qualification, generating a second path by adjusting one or more of an elevation of the first position and an elevation of the second position in accordance with the line-of-sight qualification received, projecting the second path onto the design data to generate a second profile, and determining a set of intersection points between the first profile and the second profile. The set of intersection points may include between zero and n intersection points, each of which is representative of a portion of the geographic location represented by the design data which is obstructing line-of-sight between the first and second positions. Such line-of-sight analysis may be utilized in a variety of disciplines including, by way of example only, analysis, operations, construction and/or design with respect to training facilities (e.g., military and/or law enforcement training facilities), transportation (e.g., highways), intelligent transportation systems, camera locations (e.g., security and observation cameras), stadium and/or arenas, airports, homeland security, and a variety of architectural projects.

BRIEF DESCRIPTION OF THE SEVERAL VIEWS OF THE DRAWING

The present invention is described in detail below with reference to the attached drawing figures, wherein:

FIGS. 1A through 1D illustrate a flow diagram representative of a method for implementing a training facility, e.g., a military training facility, in accordance with an embodiment of the present invention;

FIGS. 2A through 2C illustrate a flow diagram representative of a method for planning an urban training facility in accordance with an embodiment of the present invention;

FIGS. 7A through 7C illustrate a flow diagram representative of a method of designing a small arms training facility in accordance with an embodiment of the present invention;

FIGS. 8A through 8C illustrate a flow diagram representative of a method for designing a mounted or dismounted gunnery training facility in accordance with an embodiment of the present invention;

FIGS. 9A through 9C illustrate a flow diagram representative of a method for designing an objective-based training facility in accordance with an embodiment of the present invention;

FIGS. 10A through 10C illustrate a flow diagram representative of a method for reviewing an urban training facility in accordance with an embodiment of the present invention;

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention provides a method and system for implementing a training facility throughout various phases including one or more of a planning phase, a design phase, a review phase, a construction phase, and an operations phase. In various embodiments, the method and system of the present invention may include one or more of line-of-sight (LOS) analysis, berm incorporation, and design visualization and/or simulation, including operations and training. Embodiments of the present invention, or at least portions thereof, may be implemented in a computerized operating environment, and example of which is described below with reference to FIG. 17.

Figure 17:
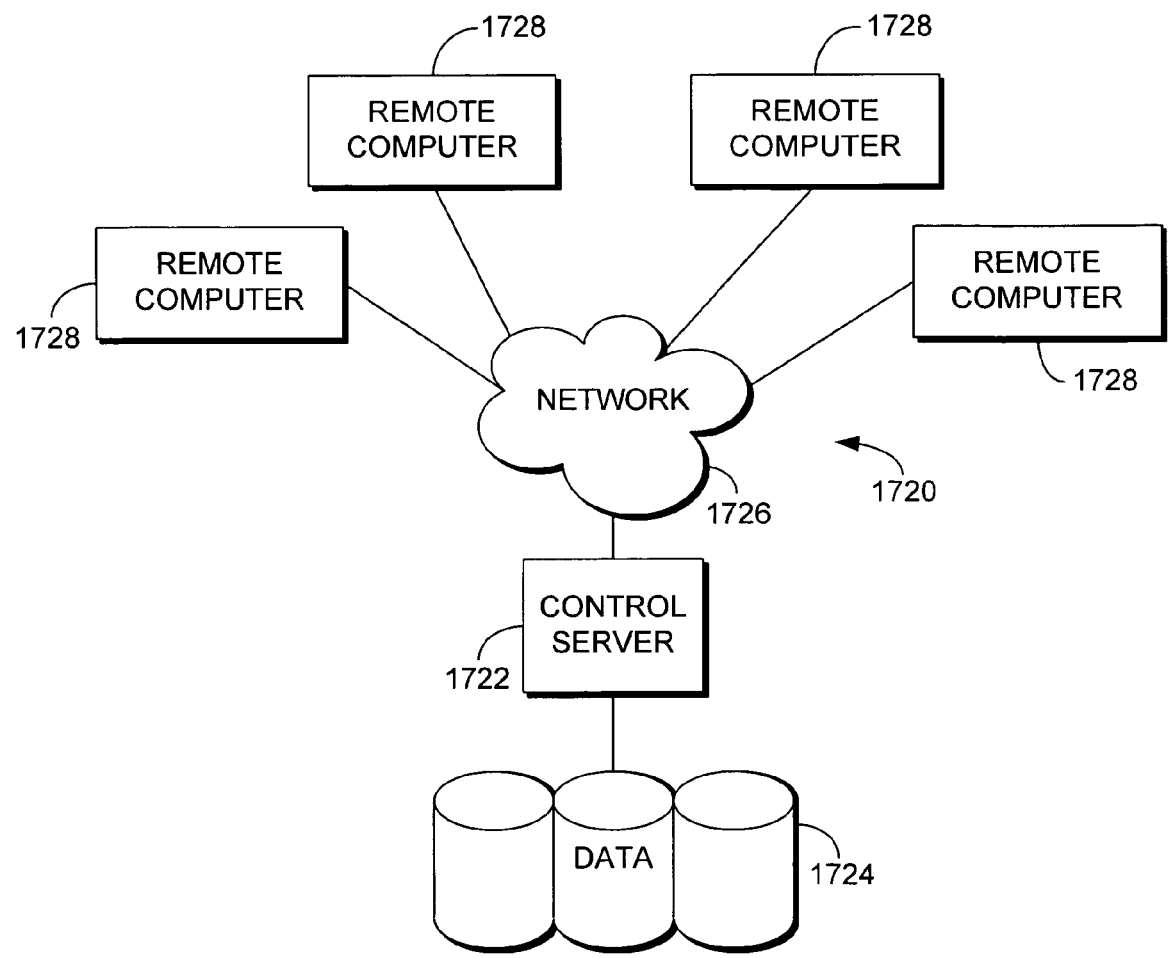
FIG. 17 is a block diagram of a computing system environment suitable for use in implementing various embodiments of the present invention.

Referring to the drawings in general, and initially to FIG. 17 in particular, an exemplary computing system environment on which the present invention may be implemented is illustrated and designated generally as reference numeral 1720. It will be understood and appreciated by those of ordinary skill in the art that the illustrated computing system environment 1720 is merely an example of one suitable computing environment and is not intended to suggest any limitation as to the scope of use or functionality of the invention. Neither should the computing system environment 1720 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

With continued reference to FIG. 17, the exemplary computing system environment 1720 includes a general purpose computing device in the form of a control server 1722. Components of the control server 1722 may include, without limitation, a processing unit, internal system memory, and a suitable system bus for coupling various system components, including database cluster 1724, with the control server 1722. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 1722 typically includes therein, or has access to, a variety of computer-readable media, for instance, database cluster 1724. Computer-readable media can be any available media that may be accessed by control server 1722, and includes volatile and nonvolatile media, as well as removable and nonremovable media. By way of example, and not limitation, computer-readable media may include computer storage media and communication media. Computer storage media may include, without limitation, volatile and nonvolatile media, as well as removable and nonremovable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by control server 1722. Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 17, including database cluster 1724, provide storage of computer-readable instructions, data structures, program modules, and other data for control server 1722.

The control server 1722 may operate in a computer network 1726 using logical connections to one or more remote computers 1728. Remote computers 1728 may be personal computers, servers, routers, network PCs, peer devices, other common network nodes, or the like, and may include some or all of the elements described above in relation to the control server 1722.

Exemplary computer networks 1726 may include, without limitation, local area networks (LANs) and/or wide area networks (WANs). Such networking environments are commonplace in offices, enterprise-wide computer networks, intranets, and the Internet. When utilized in a WAN networking environment, the control server 1722 may include a modem or other means for establishing communications over the WAN, such as the Internet. In a networked environment, program modules or portions thereof may be stored in the control server 1722, in the database cluster 1724, or on any of the remote computers 1728. For example, and not by way of limitation, various application programs may reside on the memory associated with any one or more of the remote computers 1728. It will be appreciated by those of ordinary skill in the art that the network connections shown are exemplary and other means of establishing a communications link between the computers (e.g., control server 1722 and remote computers 1728) may be utilized.

In operation, a user may enter commands and information into the control server 1722 or convey the commands and information to the control server 1722 via one or more of the remote computers 1728 through input devices, such as a keyboard, a pointing device (commonly referred to as a mouse), a trackball, or a touch pad. Other input devices may include, without limitation, microphones, satellite dishes, scanners, or the like. The control server 1722 and/or remote computers 1728 may include other peripheral output devices, such as speakers and a printer.

Although many other internal components of the control server 1722 and the remote computers 1728 are not shown, those of ordinary skill in the art will appreciate that such components and their interconnection are well known. Accordingly, additional details concerning the internal construction of the control server 1722 and the remote computers 1728 are not further disclosed herein.

As previously mentioned, in one embodiment, the present invention relates to a method and system for implementing a training facility throughout various phases including one or more of a planning phase, a design phase, a review phase, a construction phase, and an operations phase. With reference to FIGS. 1A-1D, a flow diagram of a method for implementing a training facility, from planning through operations, is illustrated and designated generally as reference numeral 100 (see FIG. 1A). "Training facilities", as the term is used herein, are areas utilized to prepare personnel, e.g., military personnel, to meet mission requirements and may include, by way of example only, firing ranges, proficiency courses, urban assault courses, and the like. Implementation of such training facilities involves a number of developmental milestones. Such milestones include, without limitation, training facility planning, design, review, construction and operations. Accordingly, as indicated at block 110 of FIG. 1A, the appropriate project development milestone of the training facility for which implementation is desired is initially determined.

If the training facility for which implementation is desired has yet to be planned, the appropriate project development milestone is training facility planning, as indicated at block 112. If the training facility for which implementation is desired has been planned but not yet designed, the appropriate project development milestone is training facility design, as indicated at block 114. If the training facility for which implementation is desired has been planned and designed but has not undergone a facility review process, and a facility review is necessary, the appropriate project development milestone is training facility review, as indicated at block 116. If the training facility for which implementation is desired has been planned, designed and reviewed as necessary but construction has yet to begin, the appropriate project development milestone is training facility construction, as indicated at block 118. If the training facility for which implementation is desired has been constructed but is not yet operational, the appropriate project development milestone is training facility operations, as indicated at block 120. Each of these project development milestones is discussed more fully below.

If it is determined at block 110 of FIG. 1A that the appropriate project development milestone for the training facility in question is training facility planning, the type of training facility for which planning is desired is subsequently determined. This is indicated at block 122 of FIG. 1B. The training facility may either be an aerial training facility, as indicated at block 124, or a ground training facility, as indicated at block 126. Aerial training facilities prepare personnel to perform mission requirements from the air while ground training facilities prepare personnel to perform mission requirements from the ground. Ground training facilities may either be urban, as indicated at block 128, or a non-urban, as indicated at block 130. Urban training facilities may include, by way of example only and not limitation, Combined Arms Collective Training Facilities (CACTFs), Live Fire Shoot Houses (LF-SHs), and Urban Assault Courses (UACs). Training facility planning for urban training facilities is more fully described below with reference to FIGS. 2A-2C.

Non-urban training facilities include small arms facilities (as indicated at block 132), gunnery facilities (as indicated at block 134) and objective-based facilities (as indicated at block 136). Small arms training facilities may include, by way of example only, Sniper Field Fire Ranges (SFFRs), Multi-Purpose Machine Gun (MPMG) training facilities, and Modified Record Fire Ranges (MRFRs). Training facility planning for small arms training facilities is more fully described below with reference to FIGS. 3A and 3B. Gunnery training facilities may include, without limitation, Digital Multi-Purpose Training Ranges (DMPTRs) and Digital Multi-Purpose Range Complexes (DMPRCs). Training facility planning for gunnery training facilities is more fully described below with reference to FIGS. 4A and 4B. Objective-based training facilities are training facilities having one or more "stations" at which one or more tasks are to be performed and may include, by way of example only, Infantry Platoon Battle Courses (IPBCs), and Battle Area Complexes (BAXs). Training facility planning for objective-based training facilities is more fully described below with reference to FIGS. 5A and 5B.

Referring back to FIG. 1A, if it is determined at block 110 that the appropriate project development milestone for the training facility in question is training facility design, the type of training facility to be designed is subsequently determined. This is indicated at block 138 of FIG. 1C. As with training facility planning, the training facility may be either an aerial training facility (as indicated at block 140) or a ground training facility (as indicated at block 142). In general, design of an aerial training facility involves determining the firing height required to obtain line-of-sight (LOS) to each of the required targets, while maintaining constant northing and easting. In accordance with an embodiment of the present invention, this firing height may be determined upon receiving the x, y coordinates of a firing position, a maximum firing height, and a height increment. Subsequently, it may be determined whether line-of-sight may be obtained from each increment, as more fully described below. The "passing" firing height, or minimum height at which line-of-sight may be obtained, may be recorded. If line-of-sight is not obtained at any of the height increments, including the maximum firing height, the target may be recorded as "not passing". In this way, it may be determined if line-of-sight requirements are satisfied for any given firing height. In addition to individual line-of-sight analysis, the individual calculations may be grouped to determine complex line-of-sight analysis replicating a moving aerial vehicle. A process for determining line-of-sight for ground training facilities, as more fully described below with reference to FIGS. 12 and 13.

If the training facility to be designed is a ground training facility, it may either be an urban facility, as indicated at block 144, or a non-urban facility, as indicated at block 146. Urban training facility design is more fully described below with reference to FIGS. 6A-6C.

Non-urban training facilities may be either small arms training facilities (as indicated at block 148), gunnery training facilities (as indicated at block 150), or objective-based training facilities (as indicated at block 152). Training facility design of small arms training facilities is more fully described below with reference to FIGS. 7A-7C, training facility design of gunnery training facilities is more fully described below with reference to FIGS. 8A-8C, and training facility design of objective-based training facilities is more fully described below with reference to FIGS. 9A-9C.

Referring back to FIG. 1A, if it is determined at block 110 that the appropriate project development milestone for the training facility in question is training facility review, the type of training facility to be reviewed is subsequently determined. This is indicated at block 154 of FIG. 1D. As with training facility planning and design, the training facility may be either an aerial training facility (as indicated at block 156) or a ground training facility (as indicated at block 158). If the training facility for which review is desired is a ground training facility, it may either be an urban facility, as indicated at block 160, or a non-urban facility, as indicated at block 162. Urban training facility review is more fully described below with reference to FIGS. 10A-10C.

Non-urban training facilities may be either small arms training facilities (as indicated at block 164), gunnery training facilities (as indicated at block 166), or objective-based training facilities (as indicated at block 168). Training facility review of gunnery and objective-based training facilities is more fully described below with reference to FIGS. 11A-11C.

Figure 2B:
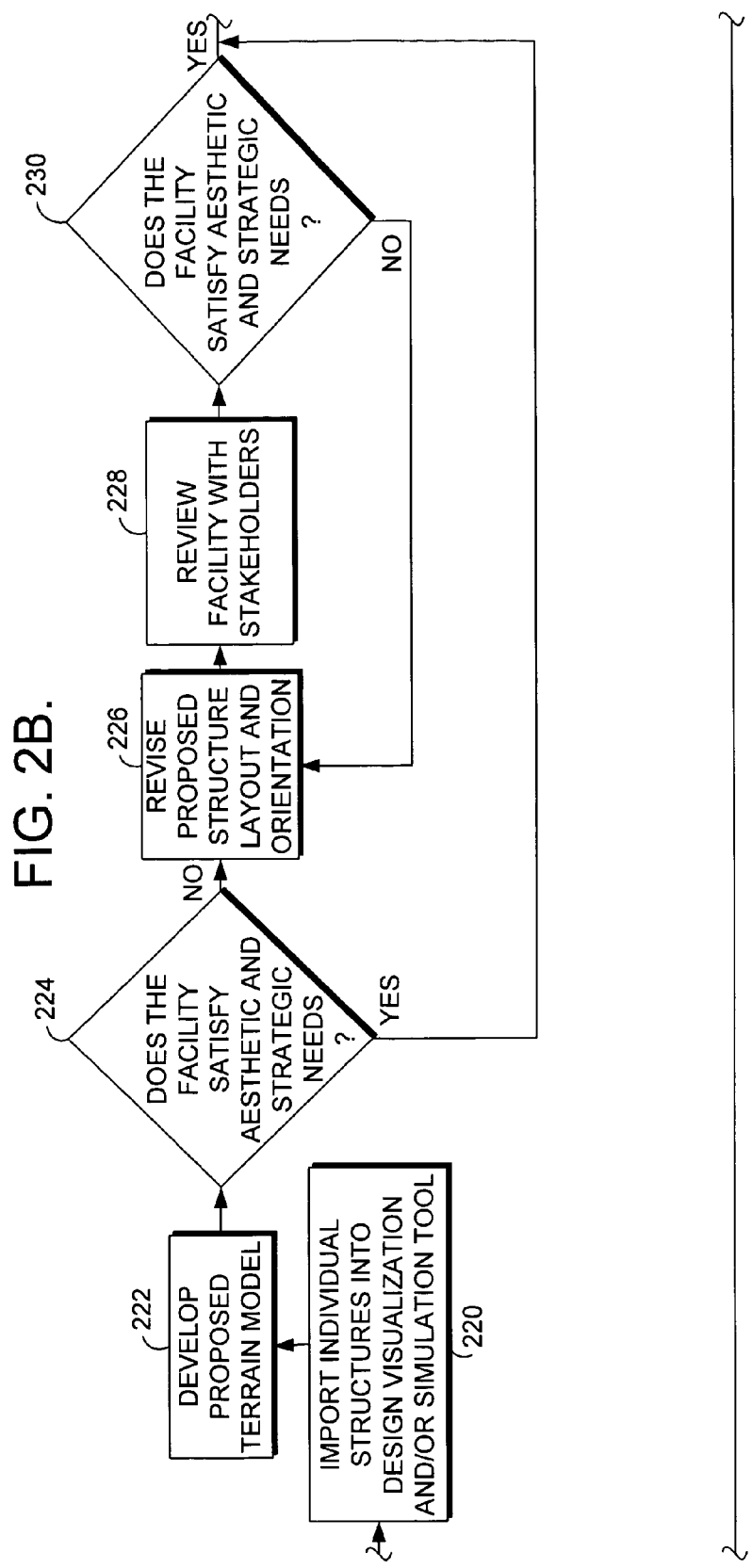

Turning now to FIGS. 2A-2C, a flow diagram is illustrated which shows a method 200 for urban training facility planning in accordance with an embodiment of the present invention. As will be understood and appreciated by those of ordinary skill in the art, for training facility planning to commence, information pertinent to the training facility being planned must first be obtained. Such information may include, without limitation, topographical and/or survey data from the parcel of land on which the training facility is to be located (as indicated at block 202 of FIG. 2A), an existing digital terrain model of the parcel of land on which the training facility is to be located (as indicated at block 204), information pertaining to any applicable environmental constraints, that is, any environmentally significant areas that must be avoided or mitigated during a construction project, e.g., wetland areas, endangered species habitats, and the like (as indicated at block 206), any existing property information and Surface Danger Zone (SDZ) constraint information (as indicated at block 208), and project-specific design criteria (as indicated at block 210). Subsequently, taking all of the information obtained into account, any structures (e.g., buildings) necessary for the urban training facility being planned are identified, as indicated at block 212.

Once the necessary structures have been identified, a structure model is developed for each individual structure, as indicated at block 214. A location and orientation for each of the structures is subsequently determined, as indicated at block 216, and such information is exported, as indicated at block 218.

Referring now to FIG. 2B, the individual structure models, as well as the corresponding location and orientation information, are subsequently imported into a design visualization and/or simulation tool, as indicated at block 220. The design visualization and/or simulation tool receives input relating to the modified design data and outputs an accurate representation of the training facility topography, vegetation, targetry, and camera locations, as applicable. In this way, a visual verification that all training requirements are satisfied is provided prior to construction being commenced. Subsequently, a proposed terrain model is developed in accordance with the visualized and/or simulated design. This is indicated at block 222.

Subsequently, as indicated at block 224, the person or entity planning the urban training facility and any interested stakeholders may collaborate to determine whether the training facility represented in the visualization and/or simulation tool satisfies all of the aesthetic and/or strategic requirements set forth within the constraints as indicated at blocks 206 and 208 and by the project-specific design criteria for the urban training facility being planned. (See FIG. 2A, block 210.) If it does, the process may proceed to the step indicated at block 232 of FIG. 2C, which step is more fully described below. However, if the training facility does not satisfy one or more of the aesthetic and/or strategic requirements and adjustments are determined to be necessary, such adjustments are made and the proposed structure layout and orientation are revised, as indicated at block 226. Such revision generally involves adjusting the location and/or orientation of one or more structures to satisfy aesthetic and/or strategic requirements.

Subsequently, the revised training facility is reviewed by the designing person/entity and any interested stakeholders, as indicated at block 228, and it is determined whether the urban training facility represented satisfies all of the aesthetic and/or strategic requirements set forth in the project-specific design criteria for the urban training facility being planned. This is indicated at block 230. If it does not, adjustments are made, the process returns to the step indicated at block 226 and the terrain model is again revised with an effort toward ensuring that the model satisfies all of the aesthetic and/or strategic requirements for the urban training facility being planned.

Turning now to FIG. 2C, once all of the aesthetic and/or strategic requirements for the urban training facility being planned are satisfied, the site layout, materials, facades, and the like are reviewed, as indicated at block 232. Upon completing this review, it is determined whether the urban training facility represented replicates the desired training environment. This is indicated at block 234. If it does, the process may proceed to the step indicated at block 250, which step is more fully described below. If it does not, one or more components within the training facility environment may be adjusted to more accurately replicate the desired training facility. This is indicated at block 236. Once any component adjustments have been made, the site layout materials, facades, and the like are again reviewed (as indicated at block 232) and a determination is made regarding whether the adjusted urban training facility replicates the desired training environment (as indicated at block 234).

Simultaneously or sequentially with respect to the site layout review, training requirements for the urban training facility being planned are assessed, as indicated at block 238. Assessment of the training requirements involves first developing a three-dimensional digital terrain model of the facility being planned. This is indicated at block 240. Subsequently, using the three-dimensional digital terrain model, shadow analysis of the training facility modeled thereby is performed, as indicated at block 242. In general, shadow analysis permits the identification of areas of threat from individual firing positions within the planned training facility by developing a plane of areas that are obscure to each firing position due to obstructions within the planned training facility.

Utilizing the results of the shadow analysis, it is subsequently determined whether or not all training requirements for the urban training facility being planned are satisfied, as indicated at block 244. If all training requirements are not satisfied, the planning individual/entity and the interested stakeholders may collaborate to determine what adjustments to the structure locations and/or orientations must be made for the training requirements to be satisfied. This is indicated at block 246. Subsequently, any adjustments determined to be necessary are made to the proposed training facility and the proposed terrain model is, accordingly, adjusted. This is indicated at block 248. Subsequently, the process returns to the step indicated at block 238, this time with the training requirement assessment, three-dimensional digital terrain model development and shadow analysis all being performed with respect to the adjusted training facility.

Alternatively, upon determining that adjustments to the terrain model are necessary, the process may return to the step indicated at block 214 of FIG. 2A and new structure models may be developed. This alternative is likely to be utilized in those circumstances where severe adjustments are necessary for the training requirements to be satisfied.

Once all training requirements are satisfied and the planned urban training facility replicates the desired training environment, the process may proceed to a design phase, as indicated at block 250. Urban training facility design is discussed more fully below with reference to FIGS. 6A-6C.

Figure 3A:
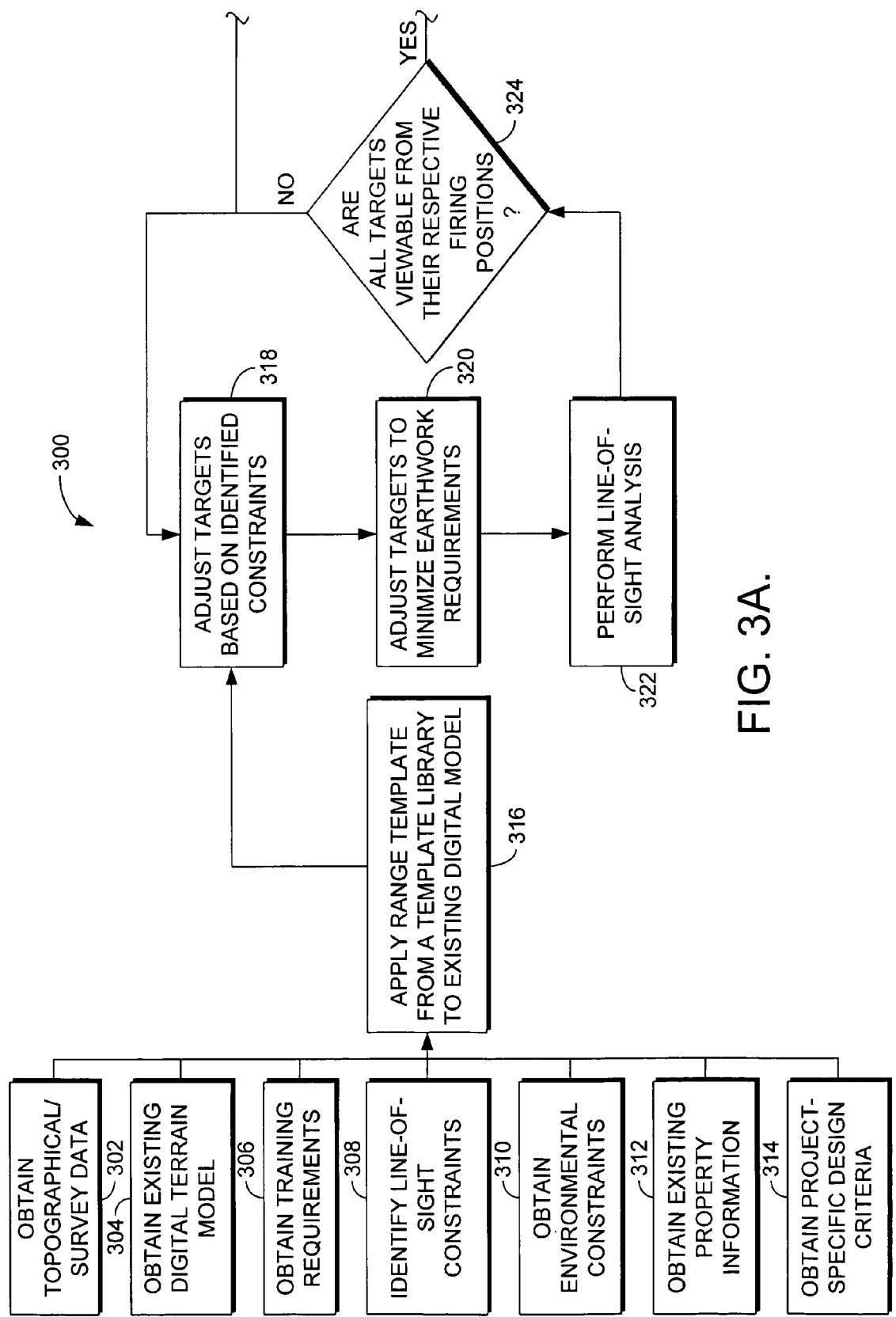
FIGS. 3A and 3B illustrate a flow diagram representative of a method for planning a small arms training facility in accordance with an embodiment of the present invention.
Figure 3B:
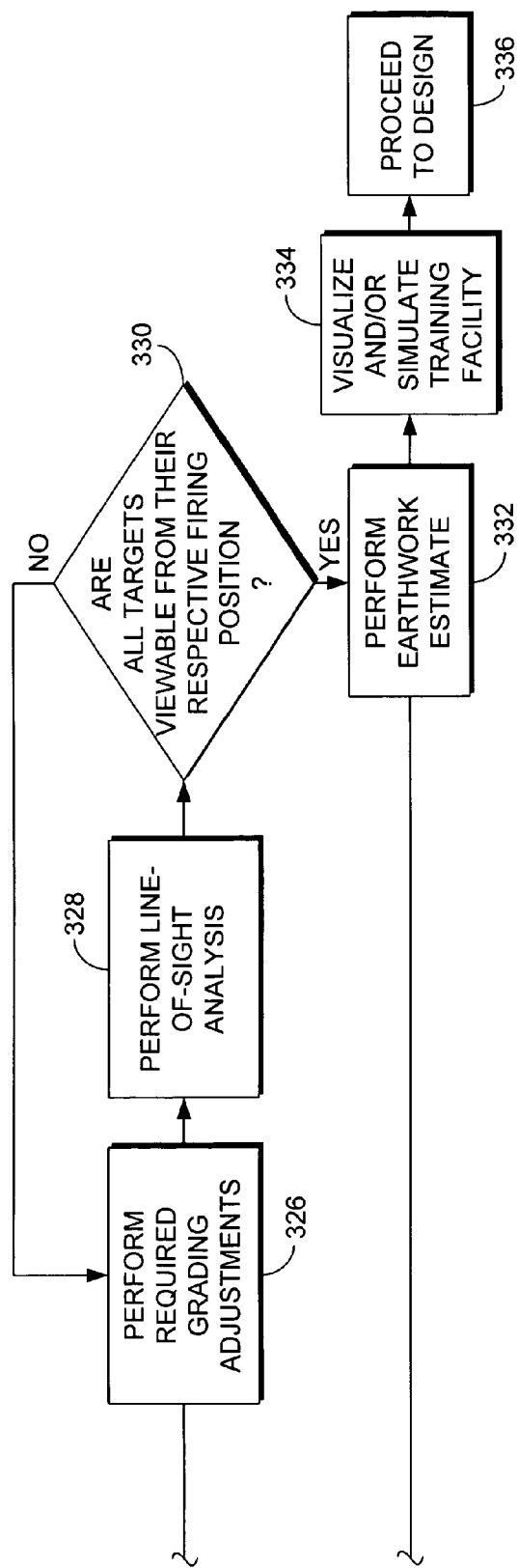

Turning now to FIGS. 3A-3B, a flow diagram is illustrated which shows a method 300 for small arms training facility planning in accordance with an embodiment of the present invention. As previously discussed with regard to urban training facility planning, for training facility planning to commence, information pertinent to the training facility being planned must first be obtained. With respect to small arms training facilities, such information may include, without limitation, topographical and/or survey data from the parcel of land on which the training facility is to be located (as indicated at block 302 of FIG. 3A), an existing digital terrain model of the parcel of land on which the training facility is to be located (as indicated at block 304), project-specific training requirements (as indicated at block 306), information pertaining to any applicable environmental constraints (as indicated at block 310), any existing property information (as indicated at block 312), and any project-specific design criteria (as indicated at block 314). Additionally, any line-of-sight constraints, e.g., view angles, berm clearances, and the like, may be identified, as indicated at block 308.

Subsequently, if available, a range template from a template library is applied to the existing digital terrain model, as indicated at block 316. It will be understood and appreciated by those of ordinary skill in the art that if a range template is not available for the small arms training facility being planned, a range template may be created for the facility being planned. Such variation is contemplated to be within the scope of the present invention.

If desired and/or necessary, targets that are present on the range template may be adjusted based upon the identified line-of-sight and environmental constraints. This is indicated at block 318. Additionally, targets that are present on the range template may be adjusted to minimize earthwork requirements, for example, lowering the elevation of the target to reduce its footprint and thereby reduce fill or adjust its location to provide line-of-sight without incorporating a berm. This is indicated at block 320. Subsequently, line-of-sight analysis may be performed to determine whether all targets are viewable from their respective firing positions, as indicated at block 322. A method for performing line-of-sight analysis in accordance with an embodiment of the present invention is illustrated graphically in FIG. 12 and designated generally as reference numeral 1200. It will be understood and appreciated by those of ordinary skill in the art that, in addition to training facilities, the line-of-sight analysis described herein may be utilized in a variety of disciplines including, by way of example only, analysis, operations, construction and/or design with respect to transportation (e.g., highways), intelligent transportation systems, camera locations (e.g., security and observation cameras), stadium and/or arenas, airports, homeland security, and a variety of architectural projects.

Figure 12:
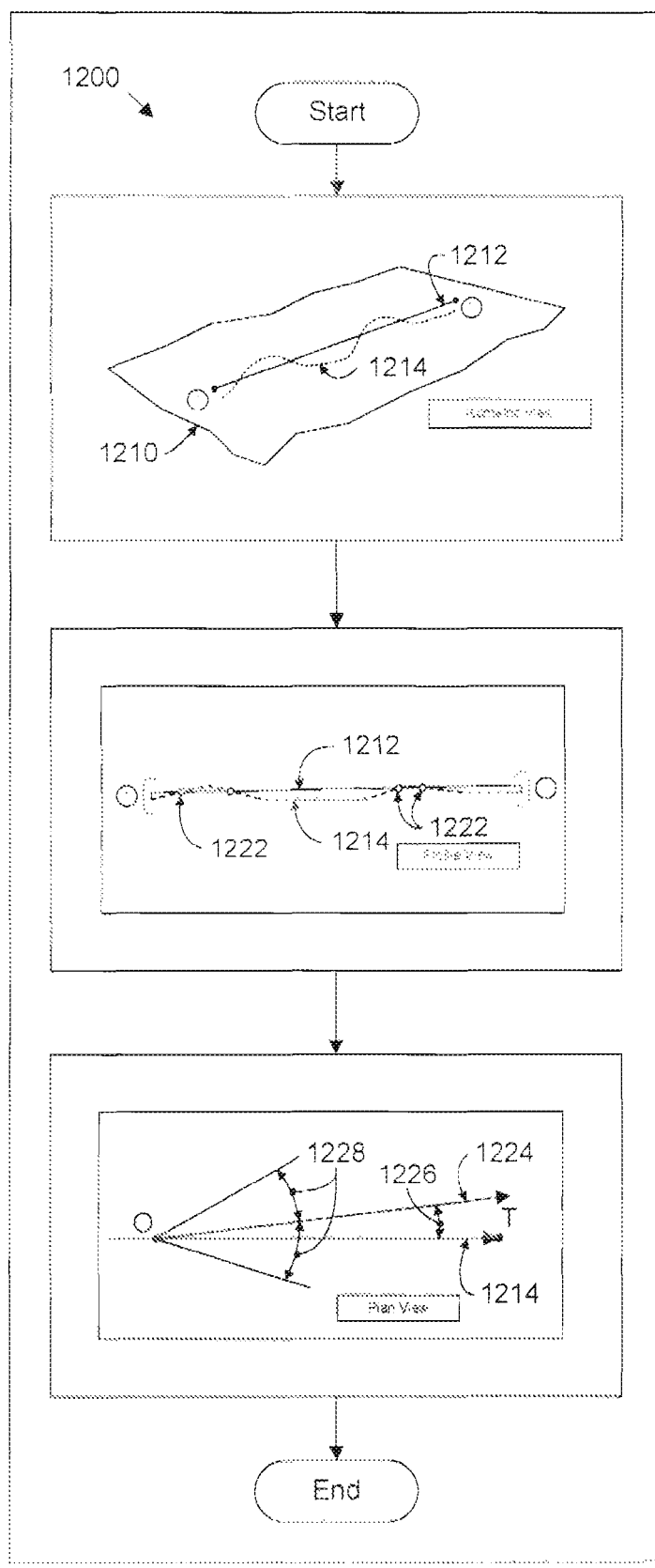
FIG. 12 is a graphical illustration of a method for performing line-of-sight (LOS) analysis in accordance with an embodiment.

Referring to FIG. 12, utilizing the existing digital terrain model obtained at block 304 of FIG. 3 having a range template applied thereto (with targets adjusted as indicated at blocks 318 and 320), the resulting digital terrain model being designated as reference numeral 1210, an observer-target path 1212 is constructed at the desired location where line-of-sight analysis is to be performed. The observer-target path is established as a set of x, y, z coordinates (or northing/easting/elevation coordinates) where the observer coordinate is $x_o$, $y_o$, $z_o$ and the target coordinate is $x_t$, $y_t$, $z_t$. The observer-target's x, y path is draped onto the digital terrain model creating an existing surface path 1214 as a set of x, y, z coordinates (or northing/easting/elevation coordinates) where the existing surface observer coordinate is $x_{oes}$, $y_{oes}$, $z_{oes}$ and the existing surface target coordinate is $x_{tes}$, $y_{tes}$, $z_{tes}$.

The intersection points calculated between the observer-target path and the existing surface path are the surface intersections 1222. The number of surface intersections may be between zero and n. Subsequently, other line-of-sight properties may be considered, for instance, in the x, y plane, the direction of the observer-target to that of the range 1224, and a corresponding angle deflection 1226 and field of view 1228. Other line-of-sight properties may include, without limitation, a surface intersection test, distance criteria, observer position field of view criteria, target position field of view criteria, slope criteria, observer height criteria, target height criteria, crossing alignment, crossing alternate firing position, general direction, and ground cover height.

Line-of-sight resultant data is calculated and stored in a consistent manner for all current observer-target pairs. Failures are set as flags to indicate which specific qualification types failed and by how much. Failures can be explained as intersection with other layers, including vegetation, environmental, line-of-sight angle, crossing other targets, and distance. Each option is also evaluated based on priority of importance based on the project-specific criteria. For example, crossing an environmentally-sensitive area might be more important than gun tube angle, or ground intersection may be more critical than ground cover intersection, although the operations rely on maintaining the vegetative ground cover from growing too tall.

Figure 13:
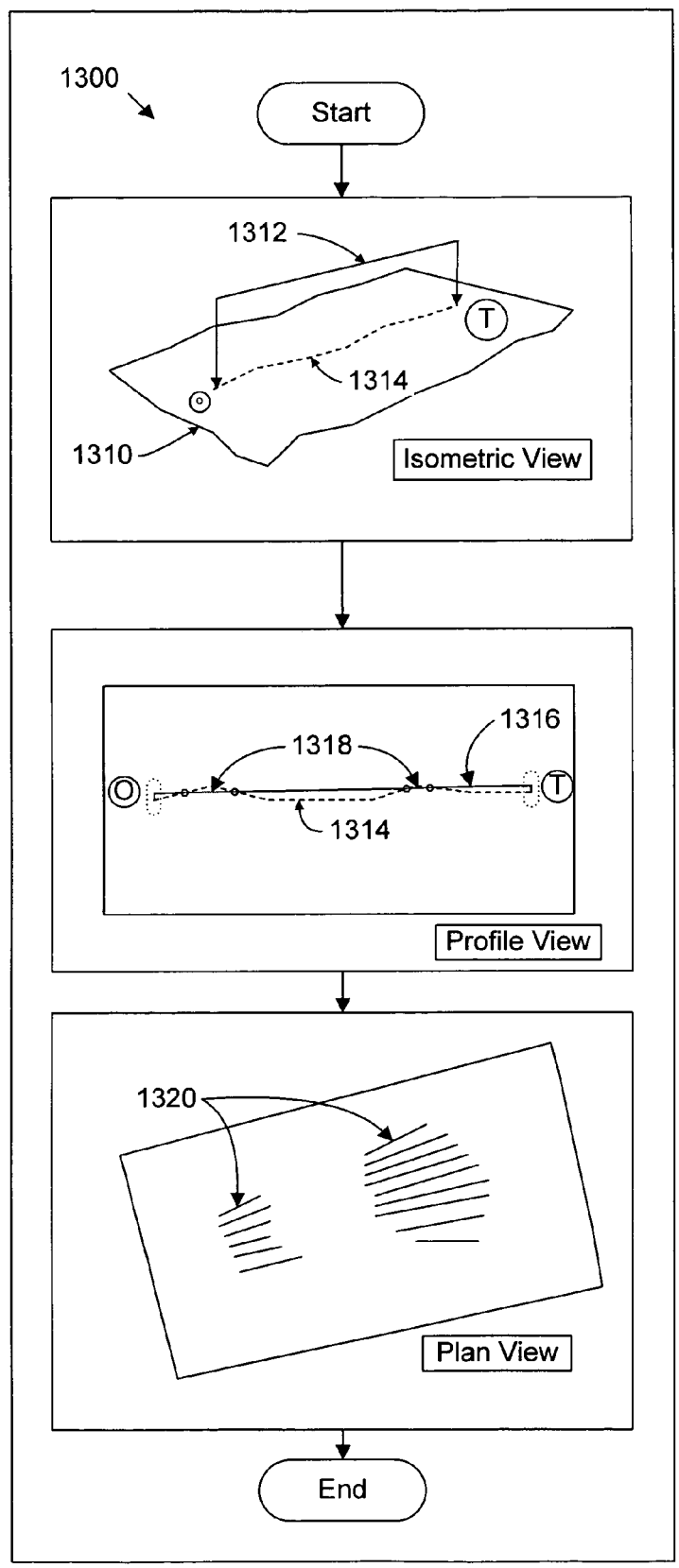
FIG. 13 is a graphical illustration of a method for designing a surface to meet line-of-sight (LOS) requirements in accordance with an embodiment of the present invention.

The results of the above-described line-of-sight calculations may subsequently be utilized to create guidelines for surface modifications that are necessary to create surfaces that meet line-of-site criteria. With reference to FIG. 13, a method of designing a surface to meet line-of-sight requirements is illustrated graphically and designated generally as reference numeral 1300. Initially, a digital terrain model 1310 representing the existing terrain is processed using the above-described line-of-sight calculation method to calculate surface intersections 1318. That is, an observer-target path 1312 is constructed at the desired location where line-of-sight analysis is to be performed and is subsequently projected onto the digital terrain model 1310 to generate a profile 1314 of the existing surface. Any necessary adjustments to the observer and/or target point elevations are subsequently made and a true target profile 1316 is established. Surface intersections 1318 between the existing surface profile 1314 and the true target profile 1316 are subsequently calculated and intersection lines 1320 that represent the surface intersections 1318 are plotted as break-line features in the existing digital terrain model 1310. Each surface intersection 1318 represents those line-of-sight intersection lines 1320 which fall below the surface of the digital terrain model 1310. Each surface intersection 1320 is then plotted as a three-dimensional break-line within the digital terrain model and the ends thereof are connected to represent a closed area of intersection that may then be lowered within the digital terrain model 1310 to achieve line-of-sight for the particular firing point to target line. In this way, guidelines for surface modifications to create surfaces that meet line-of-sight criteria may be created.

Referring back to FIG. 3A, once the line-of-sight analysis has been performed, it is determined whether all targets are viewable from their respective firing positions. This is indicated at block 324. If all targets are viewable, the process may proceed to the step indicated at block 332 of FIG. 3B, which step is more fully described below. However, if one or more targets is not viewable from its firing position, targets may again be adjusted, as indicated at blocks 318 and 320, and/or grading adjustments may be performed, as indicated at block 326 (FIG. 3B). Subsequently, line-of-sight analysis is again performed, as hereinabove described (and as indicated at blocks 322 (FIG. 3A) and 328 (FIG. 3B)), and it is again determined whether all targets are viewable from their respective firing positions, as indicated at blocks 324 (FIG. 3A) and 330 (FIG. 3B). Again, if not all targets are viewable, the process returns to steps 326, 328 (FIG. 3B) and/or 318 (FIG. 3A) until a positive answer to the questions presented in blocks 324 (FIG. 3A) and 330 (FIG. 3B) may be obtained.

Referring to FIG. 3B, once all targets are viewable from their respective firing positions, an earthwork estimate may be completed to determine the amount of earthwork that will be necessary to construct the small arms training facility being planned. (The earthwork estimate will identify the amount of soil or rock that will need to be removed or added depending on the design.) This is indicated at block 332. Next, the planned training facility may be visualized using a design visualization and/or simulation tool similar to the tool utilized at the step indicated at block 220 of FIG. 2B. This is indicated at block 334. Subsequently, the process may proceed to a design phase, as indicated at block 336. Small arms training facility design is discussed more fully below with reference to FIGS. 7A-7C.

Figure 4A:
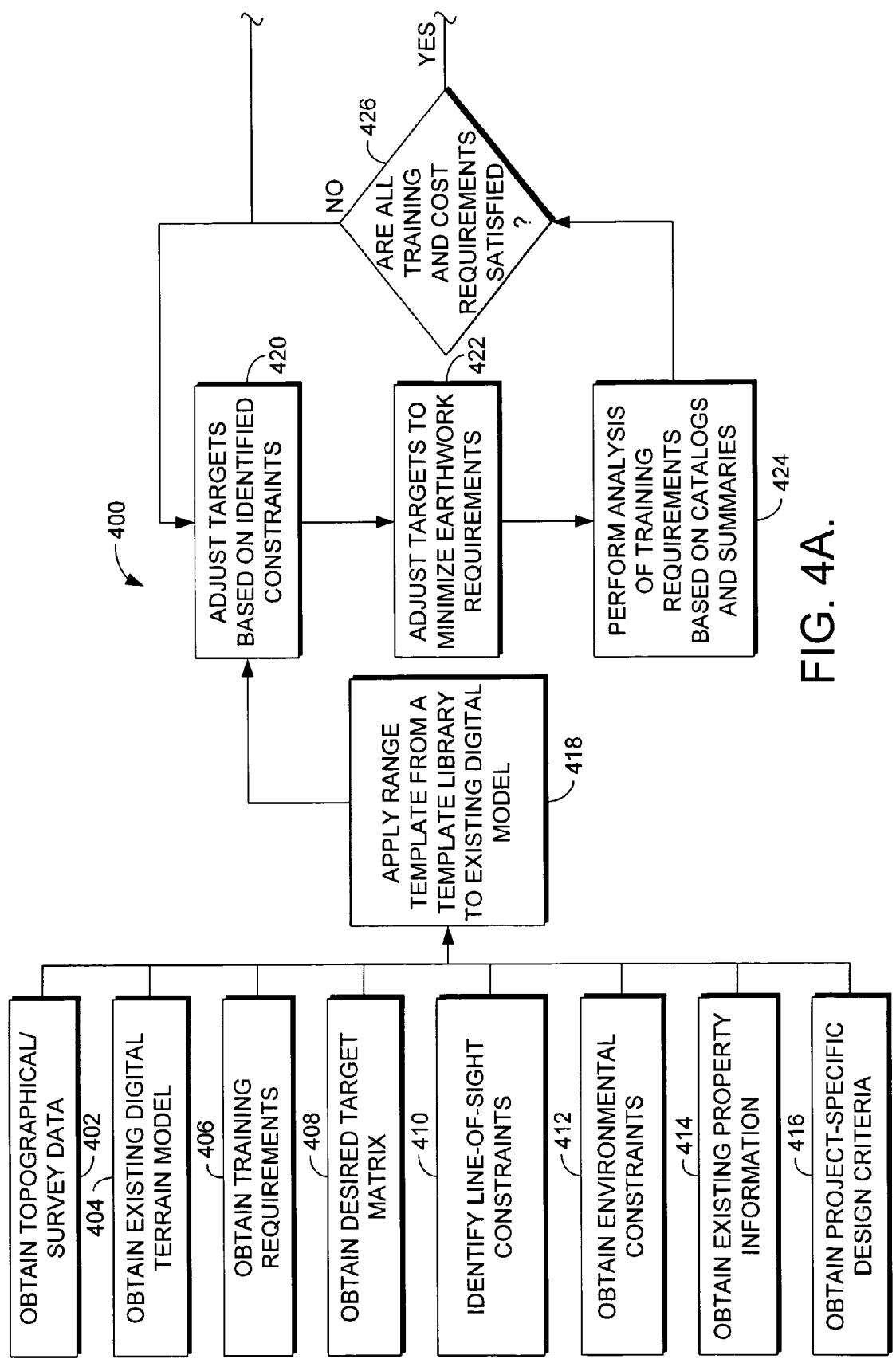
FIGS. 4A and 4B illustrate a flow diagram representative of a method for planning a mounted or dismounted gunnery training facility in accordance with an embodiment of the present invention.
Figure 4B:
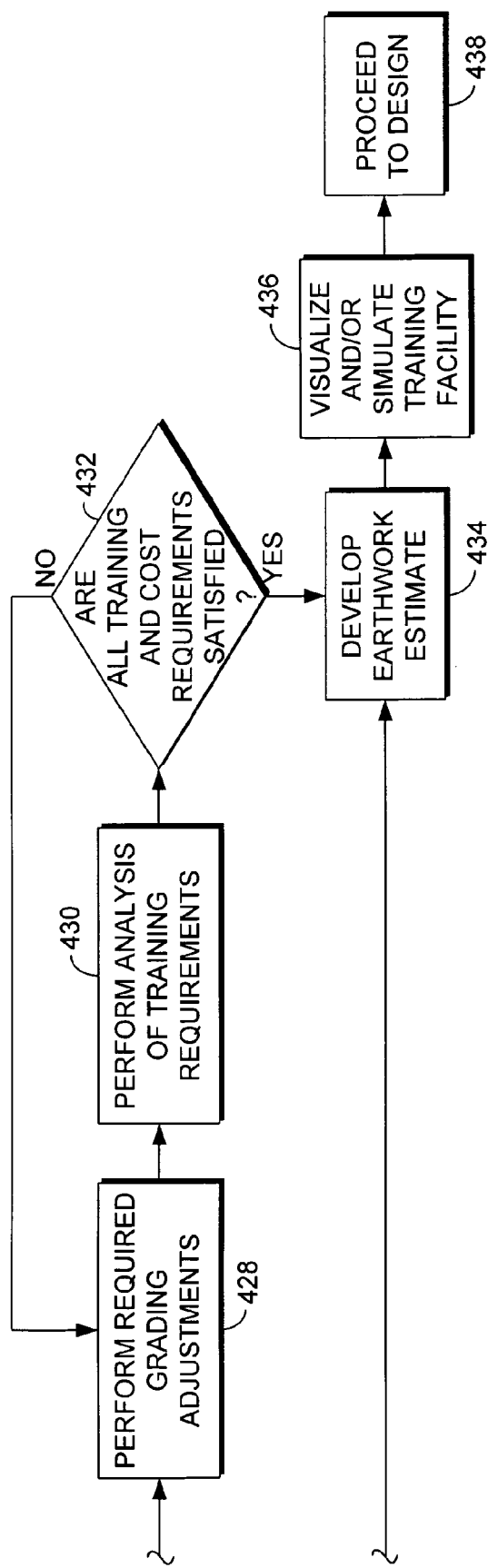

Turning now to FIGS. 4A and 4B, a flow diagram is illustrated which shows a method 400 for gunnery training facility planning in accordance with an embodiment of the present invention. As previously discussed with regard to urban and small arms training facility planning, for training facility planning to commence, information pertinent to the training facility being planned must first be obtained. With respect to gunnery training facilities, such information may include, without limitation, topographical and/or survey data from the parcel of land on which the training facility is to be located (as indicated at block 402 of FIG. 4A), an existing digital terrain model of the parcel of land on which the training facility is to be located (as indicated at block 404), project-specific training requirements (as indicated at block 406), a desired target matrix (as indicated at block 408), information pertaining to any applicable environmental constraints (as indicated at block 412), any existing property information (as indicated at block 414), and any project-specific design criteria (as indicated at block 416). Additionally, any line-of-sight constraints, e.g., view angles, berm clearances, and the like, may be identified, as indicated at block 410.

Subsequently, if available, a range template from a template library is applied to the existing digital terrain model, as indicated at block 418. It will be understood and appreciated by those of ordinary skill in the art that if a range template is not available for the gunnery training facility being planned, a range template may be created. Such variation is contemplated to be within the scope of the present invention.

If desired and/or necessary, targets that are present on the range template may be adjusted based upon the identified line-of-sight and environmental constraints. This is indicated at block 420. Additionally, targets that are present on the range template may be adjusted to minimize earthwork requirements, for example lowering the elevation of the targets to minimize the berm footprint or elevating the target in order to avoid grading to obtain line-of-sight. This is indicated at block 422. Subsequently, analysis of the training requirements may be performed based upon catalogs and summaries, as indicated at block 424. Summaries and catalogs are the result of the overall line-of-sight analysis for a training facility compared to the training requirements for a specific weapon or vehicle. The requirements are usually organized in tasks with specific types of targets and distance goals. The catalogs are the assessment of how well the training facility can accommodate the type of training desired.

Next, as indicated at block 426, it is determined whether all the training and cost requirements obtained at blocks 406 and 416 are satisfied. If all training and cost requirements are satisfied, the process may proceed to the step indicated at block 434 of FIG. 4B, which step is more fully described below. However, if one or more training and cost requirements are not satisfied, targets may again be adjusted, as indicated at blocks 420 and 422 (FIG. 4A), and/or grading adjustments may be performed, as indicated at block 428 (FIG. 4B). Subsequently, analysis of the training and cost requirements is again performed, as hereinabove described (and as indicated at blocks 424 (FIG. 4A) and 430 (FIG. 4B)), and it is again determined whether all training and cost requirements are satisfied, as indicated at blocks 426 (FIG. 4A) and 432 (FIG. 4B). Again, if not all training and cost requirements are satisfied, the process returns to steps 420, 422 (FIG. 4A) and/or 428 (FIG. 4B) until a positive answer to the questions presented in blocks 324 (FIG. 4A) and 430 (FIG. 4B) may be obtained.

With reference to FIG. 4B, once all training and cost requirements are satisfied, an earthwork estimate may be performed to determine the amount of earthwork that will be necessary to construct the gunnery training facility being planned. This is indicated at block 434. Next, the planned training facility may be visualized using a design visualization and/or simulation tool similar to the tool utilized in the step indicated at block 220 of FIG. 2B. This is indicated at block 436. Subsequently, the process may proceed to a design phase, as indicated at block 438. Gunnery training facility design is discussed more fully below with reference to FIGS. 8A-8C.

Figure 5A:
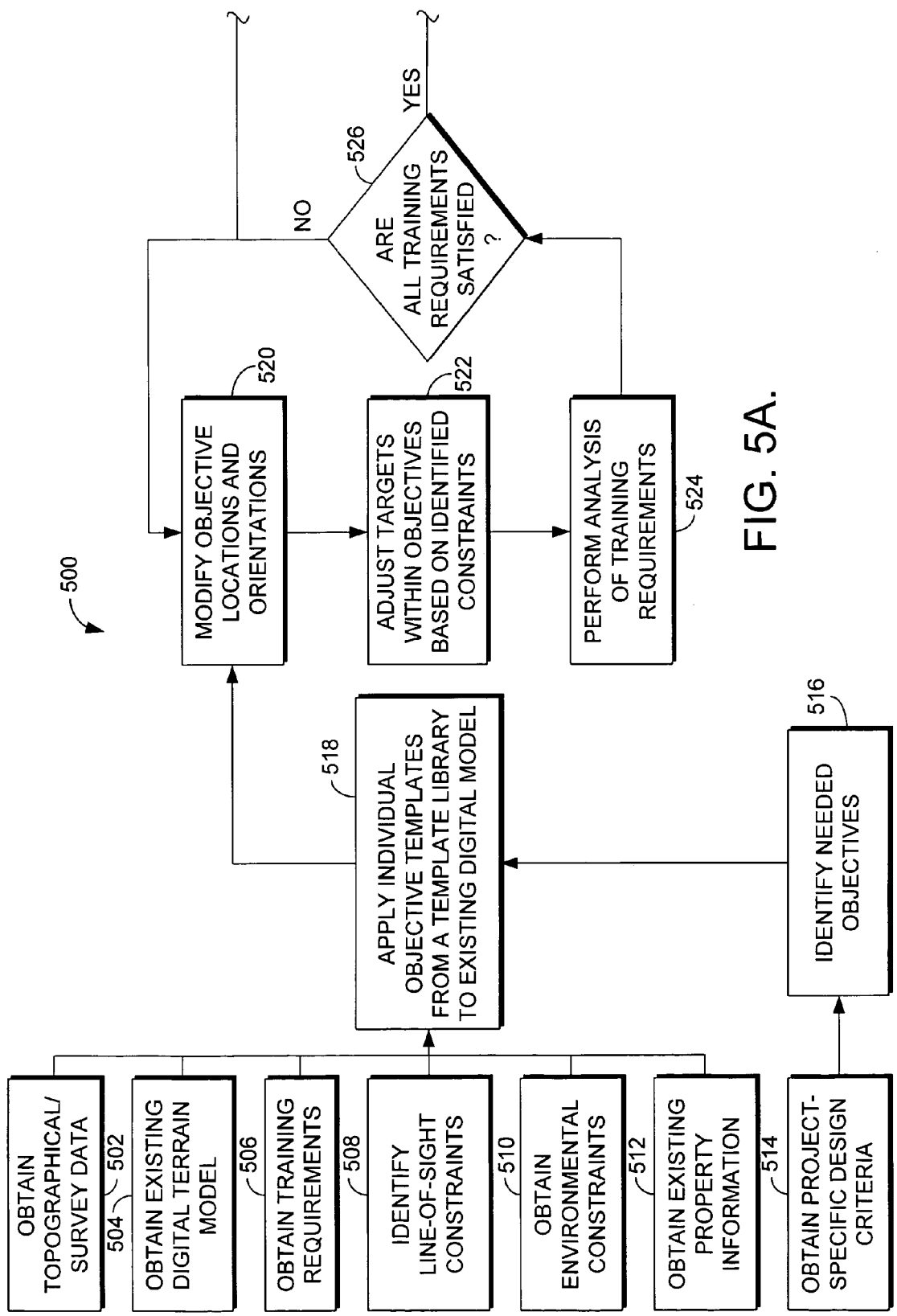
FIGS. 5A and 5B illustrate a flow diagram representative of a method for planning an objective-based training facility in accordance with an embodiment of the present invention.
Figure 5B:
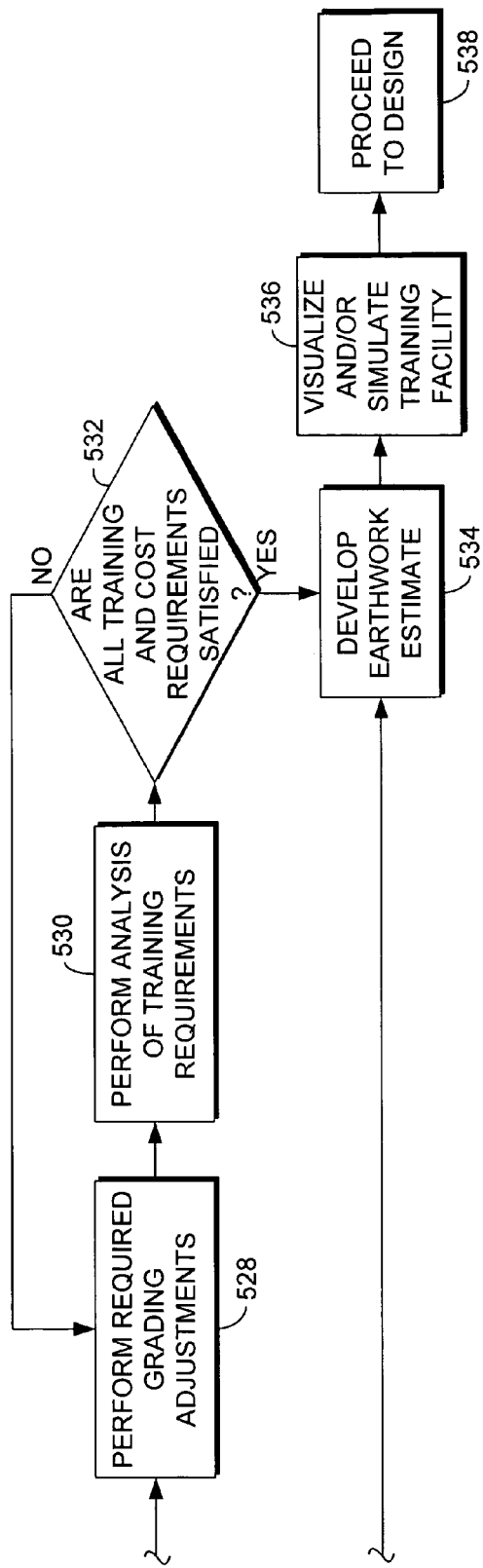

With reference now to FIGS. 5A and 5B, a flow diagram is illustrated which shows a method 500 for objective-based training facility planning in accordance with an embodiment of the present invention. As previously discussed with regard to urban, small arms, and gunnery training facility planning, for training facility planning to commence, information pertinent to the training facility being planned must first be obtained. With respect to objective-based training facilities, such information may include, without limitation, topographical and/or survey data from the parcel of land on which the training facility is to be located (as indicated at block 502 of FIG. 5A), an existing digital terrain model of the parcel of land on which the training facility is to be located (as indicated at block 504), project-specific training requirements (as indicated at block 506), information pertaining to any applicable environmental constraints (as indicated at block 510), and any existing property information (as indicated at block 512). Additionally, any line-of-sight constraints, e.g., view angles, berm clearances, and the like, may be identified, as indicated at block 508. Simultaneously or sequentially with obtaining and identifying the above-described information, any project-specific design criteria may be obtained, as indicated at block 514. Subsequently, objectives necessary for the various "stations" of the training facility being planned may be identified based upon the project-specific design criteria. This is indicated at block 516.

Subsequently, if available, a range template from a template library is applied to the existing digital terrain model, taking into account the identified objectives. This is indicated at block 518. It will be understood and appreciated by those of ordinary skill in the art that if a range template is not available for the objective-based training facility being planned, a range template may be created. Such variation is contemplated to be within the scope of the present invention.

If desired and/or necessary, the objective locations and orientations may subsequently be adjusted, as indicated at block 520. Additionally, targets within the objectives may be adjusted based upon the identified line-of-sight and environmental constraints, as indicated at block 522. Subsequently, analysis of the training and cost requirements may be performed, as indicated at block 524. By way of example only, such analysis may be conducted as a combination of line-of-sight to all targets or by applying a training table requirement.

Subsequently, as indicated at block 526, it is determined whether all the training and cost requirements obtained at blocks 506 and 514 are satisfied. If all training and cost requirements are satisfied, the process may proceed to the step indicated at block 534 of FIG. 5B, as more fully described below. However, if one or more training or cost requirements is not satisfied, objective locations and orientations may again be adjusted, as indicated at block 520 (FIG. 5A), targets may again be adjusted, as indicated at block 522 (FIG. 5A), and/or grading adjustments may be performed, as indicated at block 528 (FIG. 5B). Subsequently, analysis of the training and cost requirements is again performed, as hereinabove described (and as indicated at blocks 524 (FIG. 5A) and 530 (FIG. 5B)), and it is again determined whether all training and cost requirements are satisfied, as indicated at blocks 526 (FIG. 5A) and 532 (FIG. 5B). Again, if not all training and cost requirements are satisfied, the process returns to steps 520 (FIG. 5A), 522 (FIG. 5A), and/or 528 (FIG. 5B) until a positive answer to the questions presented in blocks 526 (FIG. 5A) and 532 (FIG. 5B) may be obtained.

Once all training and cost requirements are satisfied, an earthwork estimate may be developed to determine the amount of earthwork that will be necessary to construct the objective-based training facility being planned. This is indicated at block 534 of FIG. 5B. Next, the planned training facility may be visualized using a design visualization and/or simulation tool similar to the tool utilized at the step indicated at block 220 of FIG. 2B. This is indicated at block 536. Subsequently, the process may proceed to a design phase, as indicated at block 538. Gunnery training facility design is discussed more fully below with reference to FIGS. 9A-9C.

Figure 6A:
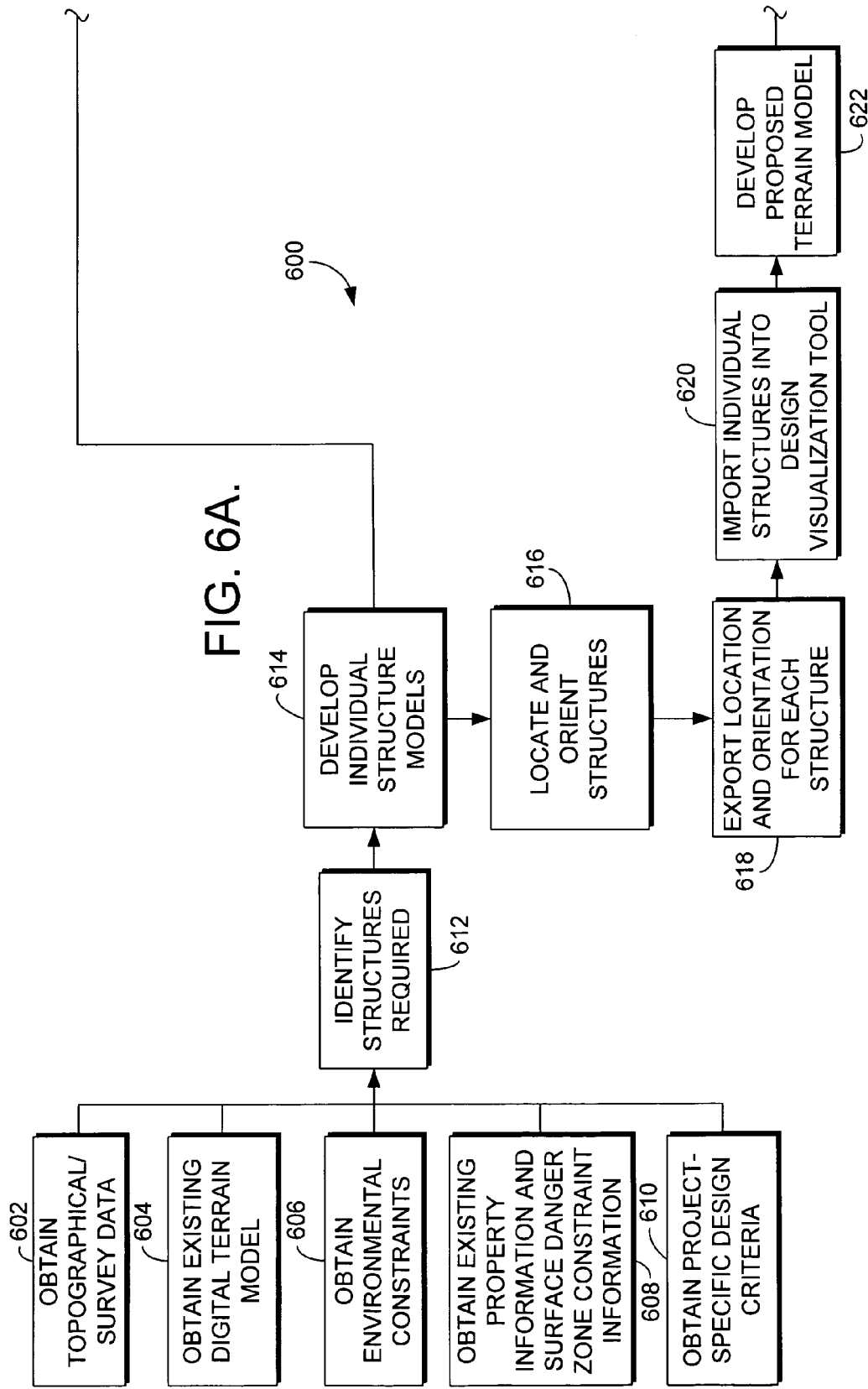
FIGS. 6A through 6C illustrate a flow diagram representative of a method for designing an urban training facility in accordance with an embodiment of the present invention.
Figure 6B:
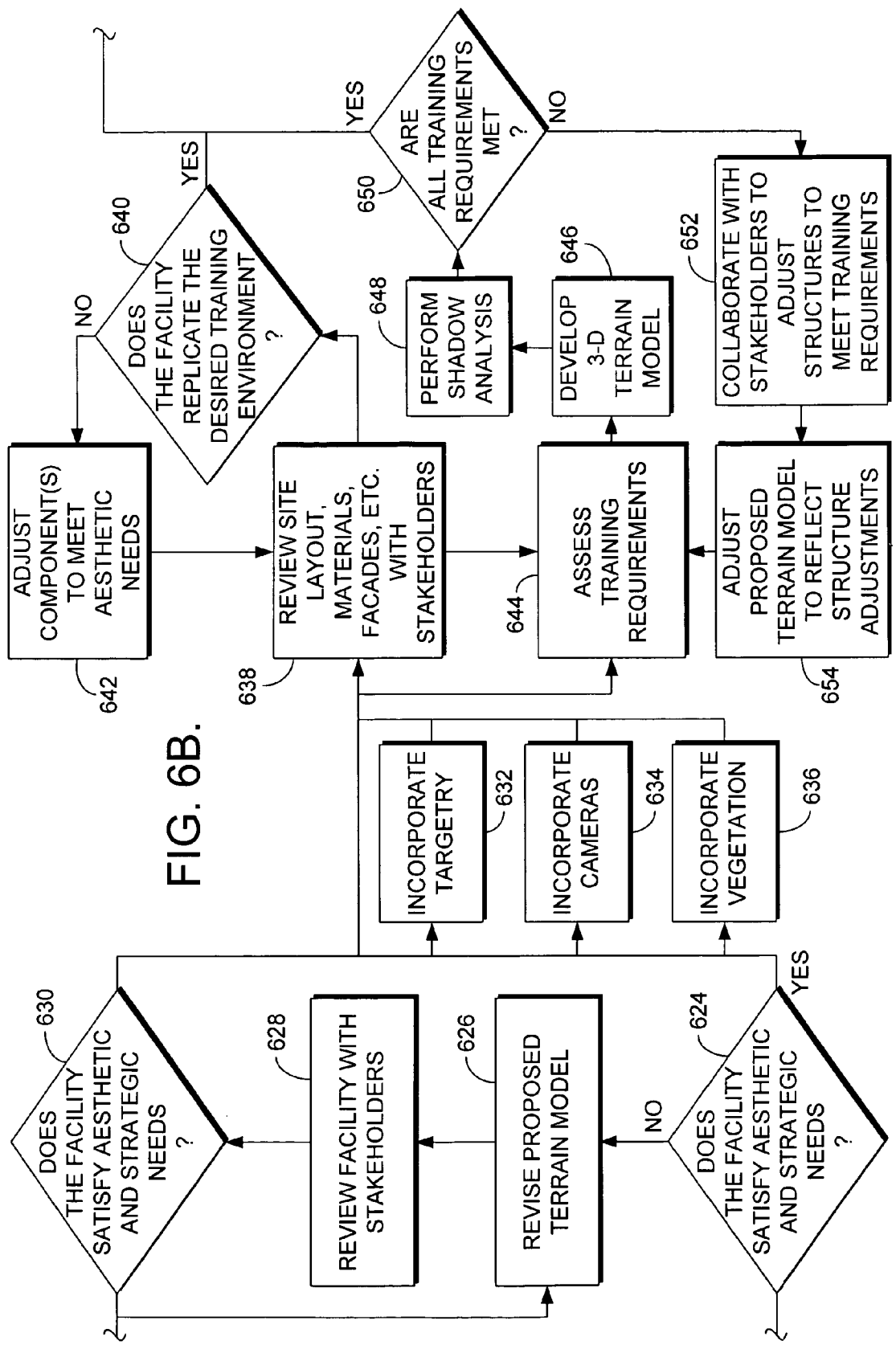

Turning now to FIGS. 6A and 6B, a flow diagram is illustrated which shows a method 600 for urban training facility design in accordance with an embodiment of the present invention. As will be understood by those of ordinary skill in the art, if it is determined at the step indicated at block 110 of FIG. 1A that the appropriate project development milestone for the training facility in question is training facility design, and the facility in question has not previously gone through the training facility planning process in accordance with the present invention, all steps shown in FIGS. 6A and 6B are likely to be completed for an urban training facility. However, if the training facility in question has previously gone through the training facility planning process in accordance with the present invention, a number of the steps shown in FIGS. 6A and 6B may have already been completed and, accordingly, may not need to be repeated. Embodiments wherein repetition of steps does occur as well as embodiments wherein repetition of steps does not occur are contemplated to be within the scope of the present invention.

Referring back to FIG. 6A, information pertinent to the training facility being designed must first be obtained in order for training facility design to commence. Such information may include, without limitation, topographical and/or survey data from the parcel of land on which the training facility is to be located (as indicated at block 602), an existing digital terrain model (as indicated at block 604), information pertaining to any applicable environmental constraints, that is, any environmentally significant areas that must be avoided or mitigated during a construction project, e.g., wetland areas, endangered species habitats, and the like (as indicated at block 606), any existing property information and Surface Danger Zone (SDZ) constraint information (as indicated at block 608), and project-specific design criteria (as indicated at block 610). Subsequently, taking all of the information obtained into account, any structures necessary for the urban training facility being designed are identified, as indicated at block 612.

Once the necessary structures have been identified, a structure model is developed for each individual structure, as indicated at block 614. A location and orientation for each of the structures is subsequently determined, as indicated at block 616, and such information is exported, as indicated at block 618. The individual structure models, as well as the corresponding locations and orientations, are subsequently imported into a design and/or simulation tool, as indicated at block 620. Subsequently, a proposed terrain model is developed in accordance with the visualized and/or simulated design. This is indicated at block 622.

Turning now to FIG. 6B, the person or entity designing the urban training facility and any interested stakeholders may subsequently collaborate to determine whether the training facility represented in the visualization and/or simulation tool satisfies all of the aesthetic and/or strategic requirements set forth in the design criteria and constraints for the urban training facility being designed, as indicated at block 624. If it does, the process may proceed to the step indicated at block 632, which step is more fully described below. However, if the proposed training facility does not satisfy all of the aesthetic and/or strategic requirements and adjustments are determined to be necessary, such adjustments are made and the proposed terrain model is revised, as indicated at block 626. Such revision generally involves adjusting the location and/or orientation of one of more structures to satisfy aesthetic and/or strategic requirements.

Subsequently, the revised training facility is reviewed by the designing person/entity and any interested stakeholders, as indicated at block 628, and it is determined whether the urban training facility represented satisfies all of the aesthetic and/or strategic requirements set forth in the design criteria for the urban training facility being designed. This is indicated at block 630. If it does not, adjustments are made, the process returns to the step indicated at block 626 and the terrain model is again revised with an effort toward ensuring that the model satisfies all of the aesthetic and/or strategic requirements for the urban training facility being designed.

In another embodiment, the steps indicated at blocks 616 through 628 may be skipped and the process may proceed directly from the step indicated at block 614 to the step indicated at block 630.

It should be noted that if the urban training facility being designed had previously gone through urban training facility planning in accordance with the present invention, the steps indicated at block 602 through 630 may not have to be repeated as such steps would have been completed during such urban training facility planning. Embodiments wherein such steps are repeated, as well as embodiments wherein such steps are not repeated, are contemplated to be within the scope hereof.

Once the aesthetic and/or strategic requirements are satisfied for the urban training facility being designed, targetry may be incorporated into the training facility represented in the proposed or revised terrain model (whichever is applicable), as indicated at block 632. Incorporating targetry includes building the foundations of the various structures in the model as well as the placement of targets within the structures. Simultaneously or sequentially with respect to incorporating targetry, cameras may be incorporated into the terrain model, if desired. This is indicated at block 634. If it is desired for cameras to be incorporated into the urban training facility being designed, they will typically be set so that all targets and firing positions may be monitored. The monitored data may subsequently be fed to a control center so that training on the range may be monitored from a remote location. It will be understood, however, that incorporation of cameras is optional and, accordingly, if it is not desired, the step indicated at block 634 may be skipped.

Simultaneously or sequentially with respect to incorporating targetry and/or cameras into the terrain model, vegetation may be incorporated, as indicated at block 636. Vegetation is plant materials that could affect the line-of-sight analysis, affect the training capability of the facility, or provide a more realistic view of the environment being represented. Vegetation can be identified as trees, grasses, shrubs, and the like.

Once targetry, cameras and vegetation have been incorporated into the proposed training facility, the site layout, materials, facades, and the like are reviewed, as indicated at block 638. Upon completing this review, it is determined whether the training facility represented replicates the desired training facility. This is indicated at block 640. If it does, the process may proceed to the step indicated at block 656 of FIG. 6C, which step is more fully described below. If it does not, one or more components of the training facility environment may be adjusted to meet the aesthetic and/or strategic needs of the training facility. This is indicated at block 642. Once any component adjustments have been made, the site layout, materials, facades, and the like are again reviewed (as indicated at block 638) and a determination is made regarding whether the urban training facility represented in the adjusted terrain model replicates the desired training facility (as indicated at block 640).

Simultaneously or sequentially with respect to the site layout review, training requirements for the urban training facility being designed are assessed, as indicated at block 644. Utilizing information attained from such assessment, a three-dimensional digital terrain model of the facility being designed is developed. This is indicated at block 646. Subsequently, using the three-dimensional digital terrain model, shadow analysis of the training facility modeled thereby is performed, as indicated at block 648. As previously described with respect to urban training facility planning, shadow analysis generally permits the identification of areas of threat from individual firing positions within the training facility in question by developing a plane of areas that are obscure to each firing position due to obstructions within the facility.

Utilizing the results of the shadow analysis, it is subsequently determined whether or not all training requirements for the urban training facility being designed are satisfied, as indicated at block 650. If one or more of the training requirements is not satisfied, the planning individual/entity and any interested stakeholders may collaborate to determine what adjustments to the structure locations and/or orientations must be made for the training requirements to be satisfied. This is indicated at block 652. Subsequently, any adjustments determined to be necessary are made to the proposed training facility and the proposed terrain model is, accordingly, adjusted. This is indicated at block 654. Subsequently, the process returns to the step indicated at block 644, this time with the training requirement assessment, three-dimensional digital terrain model development and shadow analysis all being performed with respect to the adjusted training facility.

Figure 6C:
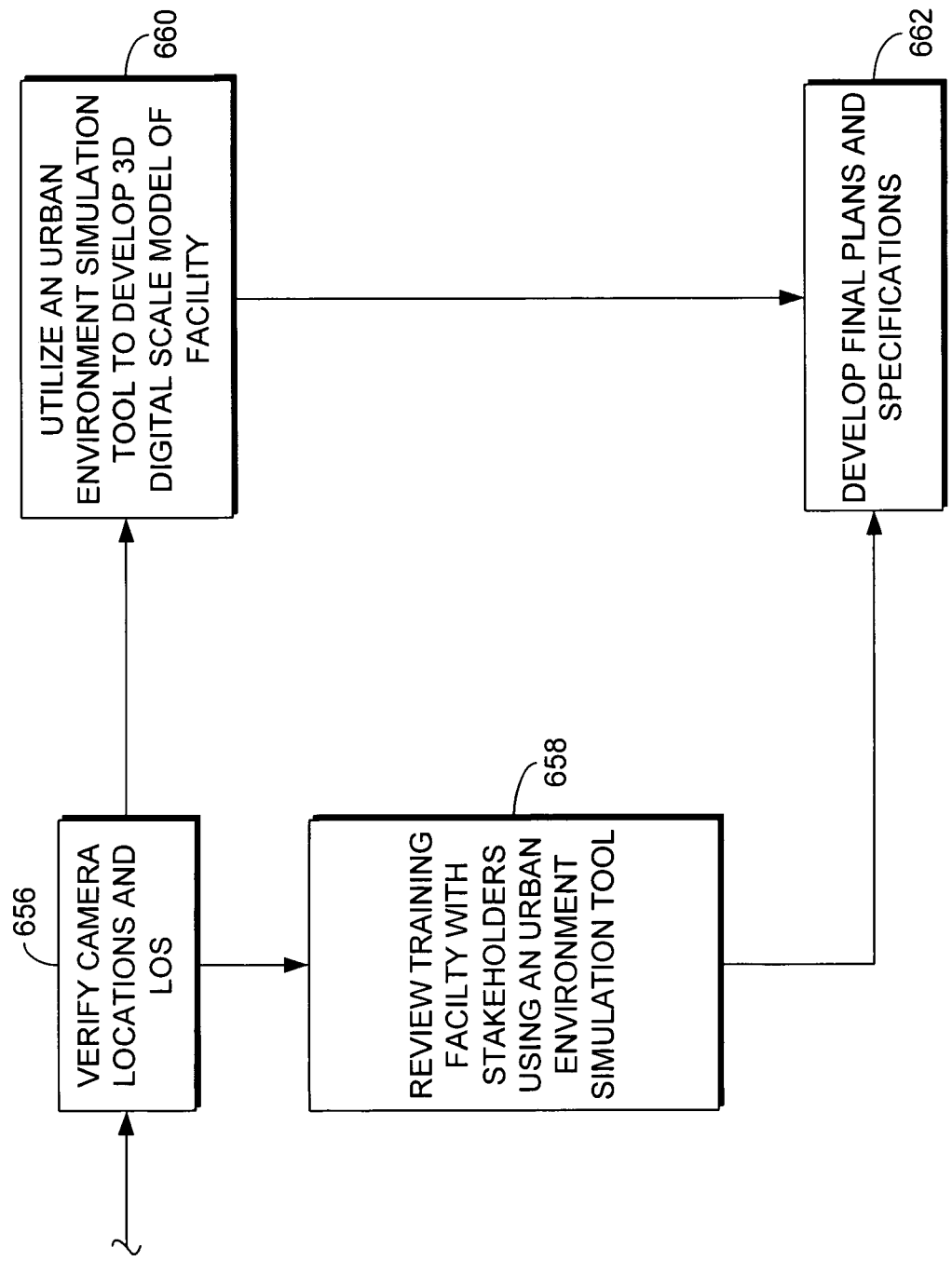

Once all training requirements are met and the designed urban training facility replicates the desired training environment, the process may proceed to a final design phase shown in FIG. 6C. During the final design phase, camera locations (if applicable) and line-of-sight are verified, as indicated at block 656. Subsequently, the designed training facility is reviewed by the designing person/entity and the interested stakeholders using an urban environment simulation tool, as indicated at block 658. Simultaneously or sequentially with the review, the urban environment simulation tool is also used to develop a three-dimensional digital scale model of the designed facility, as indicated at block 660. Subsequently, final plans and specifications are developed, as indicated at block 662.

Figure 7A:
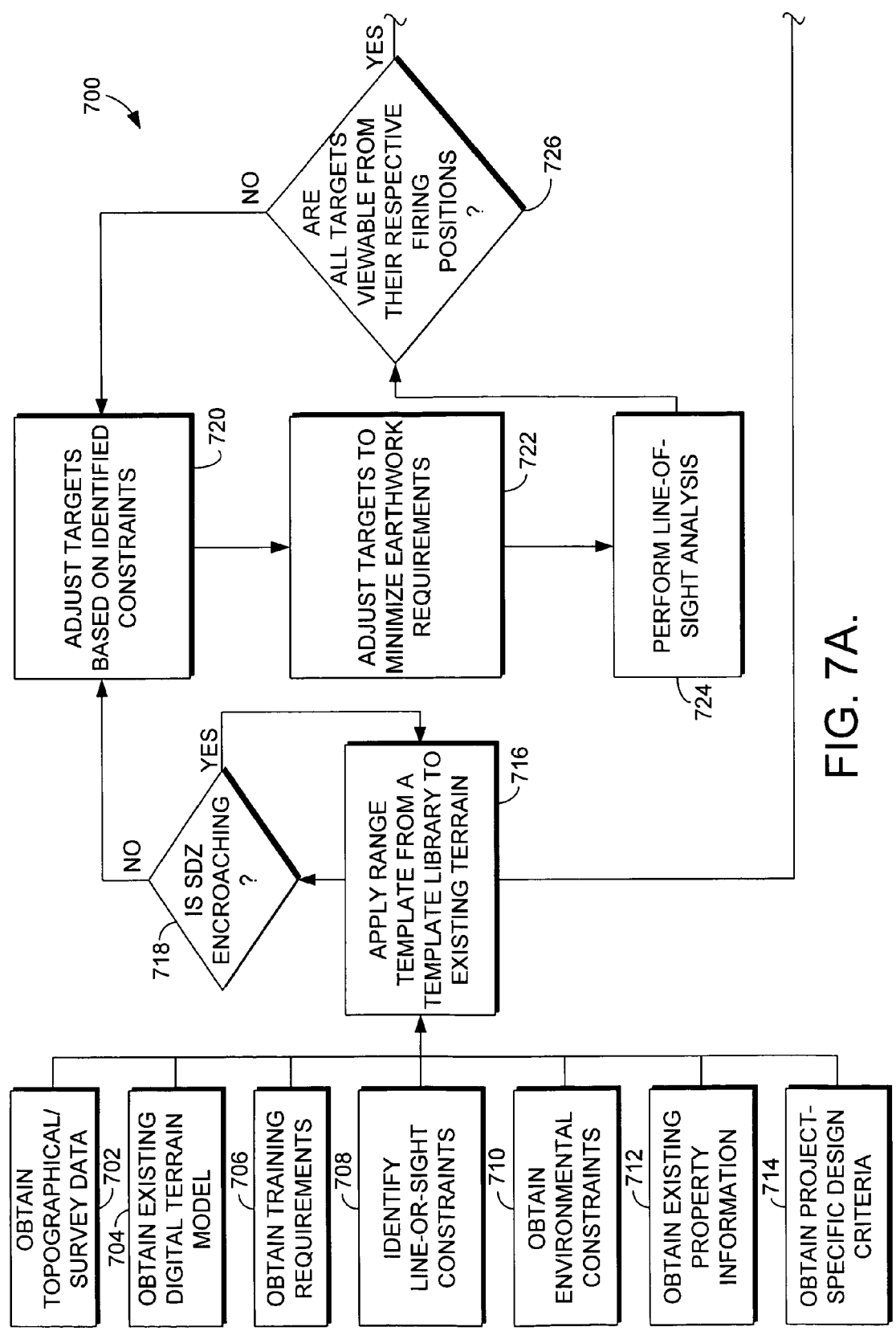
Figure 7C:
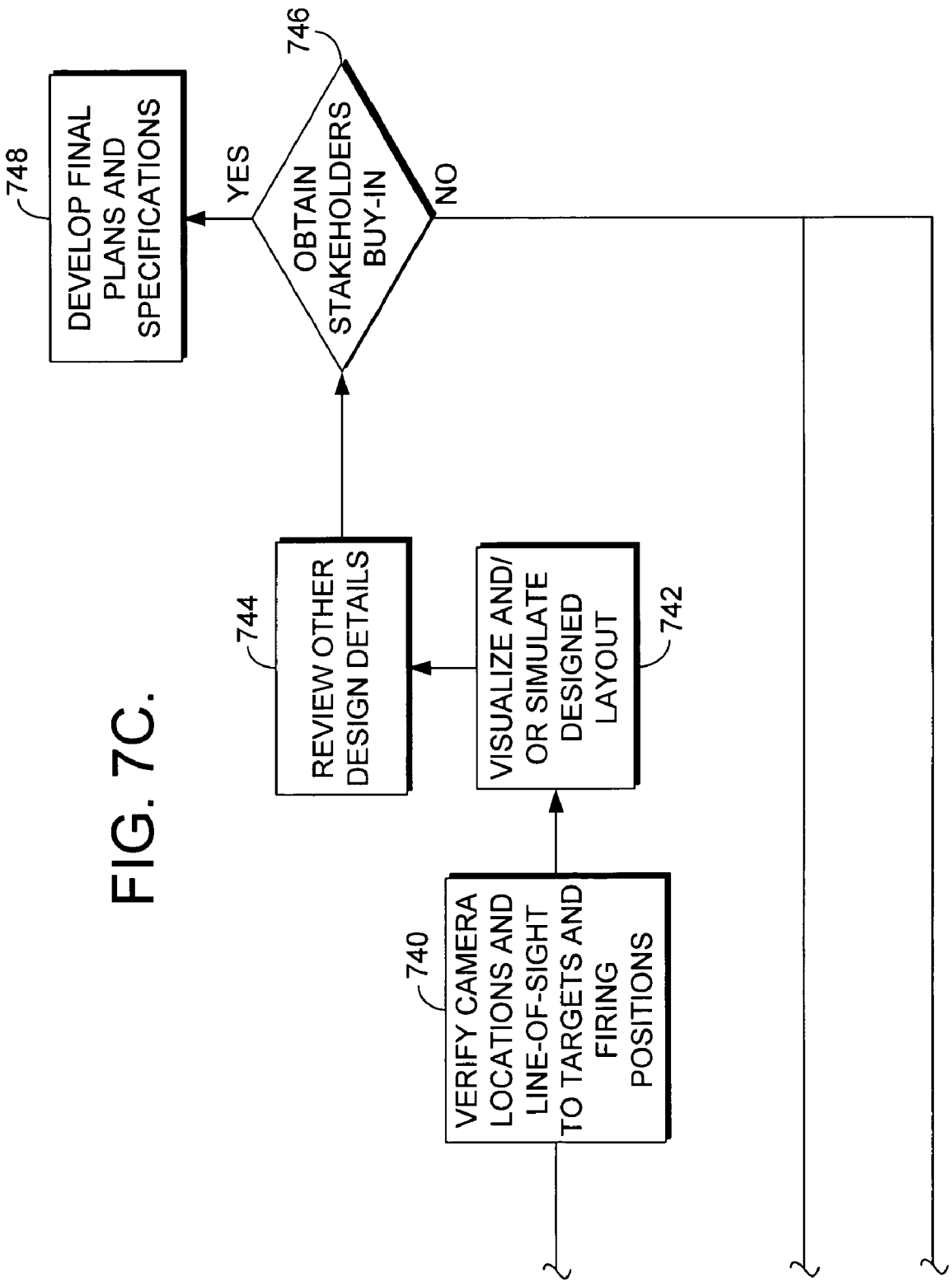

Turning now to FIGS. 7A-7C, a flow diagram is illustrated which shows a method 700 for small arms training facility design in accordance with the present invention. As previously discussed with regard to urban training facility design, for training facility design to commence, information pertinent to the training facility being designed must first be obtained. With respect to small arms training facilities, such information may include, without limitation, topographical and/or survey data from the parcel of land on which the training facility is to be located (as indicated at block 702 of FIG. 7A), an existing digital terrain model of the parcel of land on which the training facility is to be located (as indicated at block 704), project-specific training requirements (as indicated at block 706), information pertaining to any applicable environmental constraints (as indicated at block 710), any existing property information and Surface Danger Zone (SDZ) constraint information (as indicated at block 712), and any project-specific design criteria (as indicated at block 714). Additionally, any line-of-sight constraints, e.g., view angles, berm clearances, and the like, may be identified as indicated at block 708. Subsequently, if available, a range template from a template library is applied to the existing digital terrain model, as indicated at block 716. It will be understood and appreciated by those of ordinary skill in the art that if a range template is not available for the small arms training facility being planned, a range template may be created for the facility being designed. Such variation is contemplated to be within the scope of the present invention.

Once the range template has been applied to the existing digital terrain model, it is determined whether the SDZ is encroaching the range, as indicated at block 718. If the SDZ is encroaching, the process may return to the step indicated at block 716 and the range template may be applied to the existing digital terrain model at a different location or orientation, after which it is again determined whether the SDZ is encroaching.

Once it is determined that the SDZ is not encroaching, targets that are present on the range template may be adjusted based upon the identified line-of-sight and/or environmental constraints. This is indicated at block 720. Additionally, targets that are present on the range template may be adjusted to minimize earthwork requirements, for example lowering the elevation of the targets to minimize the berm footprint or elevating the target in order to avoid grading to obtain line-of-sight, as indicated at block 722. Subsequently, line-of-sight analysis may be performed to determine whether all targets are viewable from their respective firing positions, as indicated at block 724. A method for performing line-of-sight analysis in accordance with an embodiment of the present invention was described hereinabove with reference to FIGS. 12 and 13.

Once the line-of-sight analysis has been performed, it is determined whether all targets are viewable from their respective firing positions. This is indicated at block 726. If all targets are viewable, the process may proceed to the step indicated at block 728 of FIG. 7B, which step is more fully described below. However, if one or more targets is not viewable from its firing position, targets may again be adjusted, as indicated at blocks 720 and 722. Subsequently, line-of-sight analysis is again performed, as hereinabove described (and as indicated at block 724) and it is again determined whether all targets are viewable from their respective firing positions, as indicated at block 726. Again, if not all targets are viewable, the process returns to step 720 until a positive answer to the question presented in block 726 may be obtained.

Once all targets are viewable from their respective firing positions, target berms may be incorporated into the digital terrain model, as indicated at block 728. A method of placing design berms by point place in accordance with an embodiment of the present invention is graphically illustrated in FIG. 14 and a method of placing design berms by path placement in accordance with an embodiment of the present invention is graphically illustrated in FIG. 15.

Figure 14:
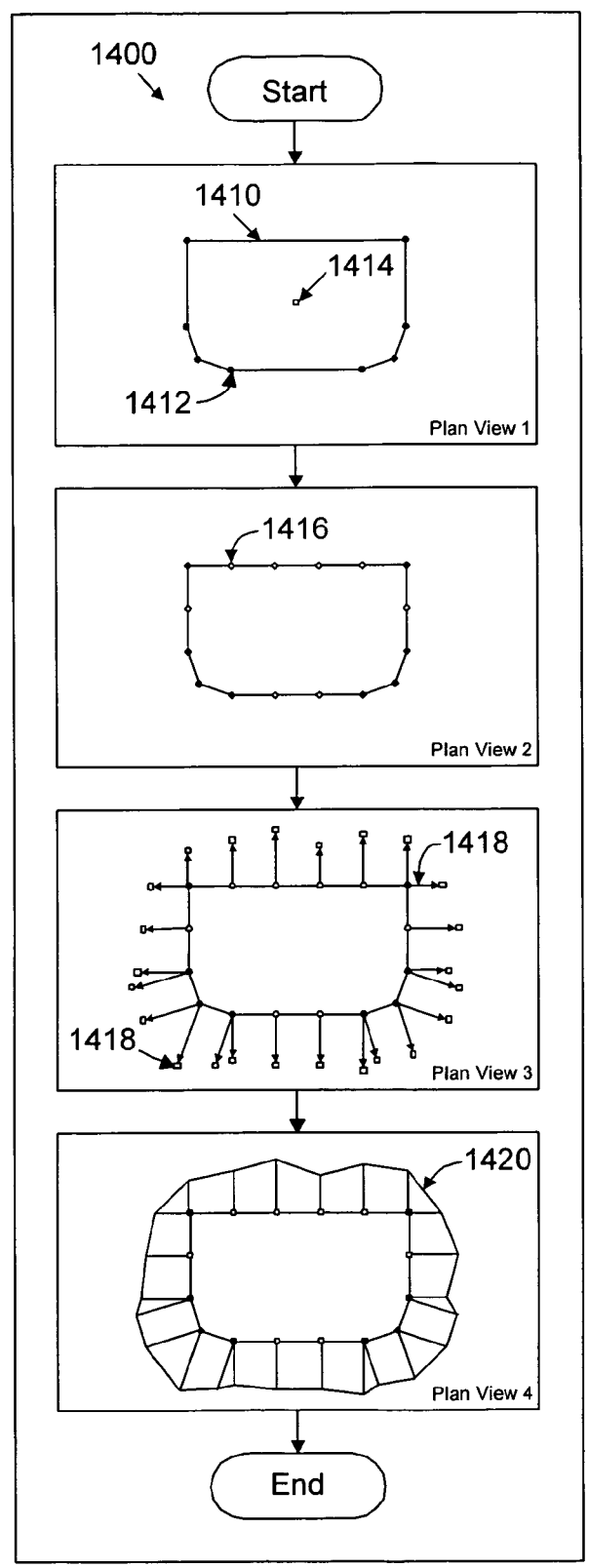
FIG. 14 is a graphical illustration of a method for incorporating berms into design data, e.g., a digital terrain model, by point placement in accordance with an embodiment of the present invention.

With reference to FIG. 14, a method of placing berms by point placement is illustrated and designated generally as reference numeral 1400. Initially, a berm template 1410 which is stored as a series of x, y coordinates 1412 with slope tie-in criteria stored as a segment representing the shape of the specific berm, is placed on a proposed digital terrain model. The coordinates are stored referencing an anchor point or local origin 1414. The berm template is placed within the limits of the proposed digital terrain model by the berm elevation of the anchor point 1414 and rotated as necessary to match the prescribed orientation. Additional points 1416 are added based on input settings to increase the accuracy with tie-in to the existing digital terrain model. Slope rays using specified slope criteria are projected to the existing digital terrain model until they intersect, as indicated at block 1418. The berm template 1410 is then added to the proposed digital terrain model as a break-line feature. Also, the resulting set of intersecting points is added to the proposed digital terrain model as a break-line feature. All random feature points of the existing digital terrain model that fall within the limits of the set of intersecting points are removed. Likewise, any break-line features that intersect the set of intersecting points are geometrically clipped. Once the specified berms have been added, the proposed digital terrain model is re-triangulated to accurately represent the new design surface 1420.

Figure 15:
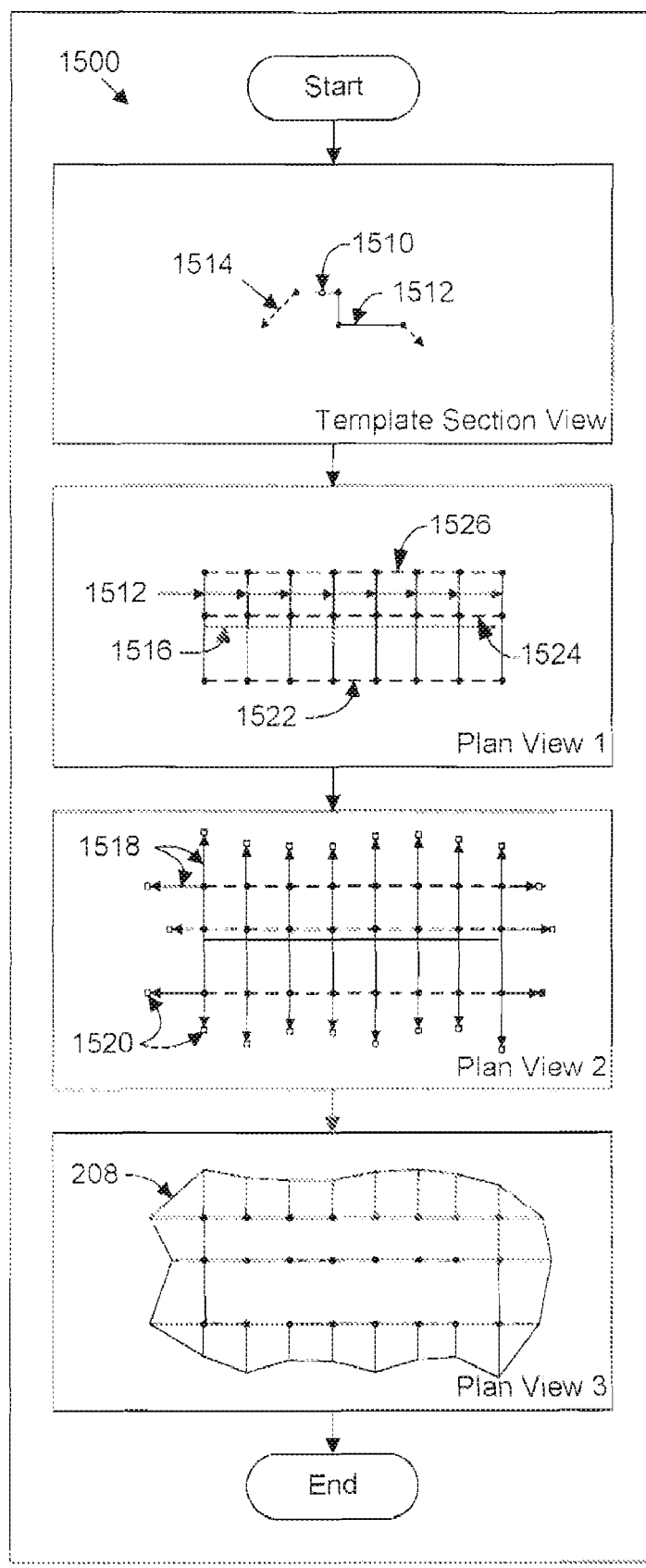
FIG. 15 is a graphical illustration of a method for incorporating berms into design data, e.g., a digital terrain model, by path placement in accordance with an embodiment of the present invention.

With reference to FIG. 15, a method of placing berms by path placement is illustrated and designated generally as reference numeral 1500. Initially, a berm template 1512 representing a cross-section that is to be swept along a path 1516 is placed on the target digital terrain model. The path may consist of a series of straight or curved line segments. The berm template 1512 is stored as a series of x, y coordinates referencing an anchor point or local origin 1510. Slope tie-in criteria 1514 is stored in the berm template 1512. Berm templates are repeated at a specified spacing along the path 1516 to increase accuracy. Slope rays 1518 using specified slope criteria are projected onto the existing digital terrain model until they intersect the existing digital terrain model, as indicated at 1520. Break-lines 1522 connecting points from one berm template to another at matching offsets are added to the proposed digital terrain model. Break-lines 1524, 1526 are also added to the proposed digital terrain model. All random feature points of the existing digital terrain model that fall within the limits of the break-lines 1526 are removed. Likewise, any break-line features that intersect the break-lines 1526 are geometrically clipped. Once the specified berms have been added, the proposed digital terrain model is re-triangulated to accurately represent the new design surface 208.

Returning to FIG. 7B, in addition to target berms, if desired, cameras may be incorporated into the digital terrain model, as indicated at block 730. Simultaneously or sequentially, an earthwork estimate may be developed to determine the amount of earthwork that will be necessary to construct the small arms training facility being designed. This is indicated at block 732. Next, line-of-sight analysis may be performed on the designed training facility as hereinabove described with reference to FIGS. 12 and 13. This is indicated at block 734.

Subsequently, it is determined whether all targets are viewable from their respective firing positions, that is, all targets in the same lane (i.e., group of range elements having a defined relationship) as the firing position. This is indicated at block 736. If all targets are not viewable from their respective firing positions, grading and/or target adjustments may be performed, as indicated at block 738. Once the grading and/or target adjustments have been made, the process may return to the steps indicated at blocks 728, 730, and 732, as necessary, and line-of-sight analysis may again be performed (as indicated at block 734).

Once a positive answer to the question presented in block 736 is obtained, the process may proceed to a final design phase shown in FIG. 7C wherein camera locations and line-of-sight to the various targets and firing positions is verified. This is indicated at block 740. Subsequently, the designed layout may be simulated using, for example, CAD and/or a three-dimensional simulation tool. This is indicated at block 742. Next, any additional design details are reviewed, as indicated at block 744, and a stakeholder buy-in is obtained, as indicated at block 746. If the stakeholders determine that they do not wish to buy into the designed small arms training facility, the process may return to the step indicated at block 716 and the range template may be applied to the digital terrain model obtained in the step indicated at block 704 at a different location or orientation, or the process may return to the step indicated at block 738 and additional grading and/or target adjustments may be performed. If, however, the stakeholders determine that they do wish to buy into the designed small arms training facility, final plans and specifications may be developed, as indicated at block 748.

Figure 8B:
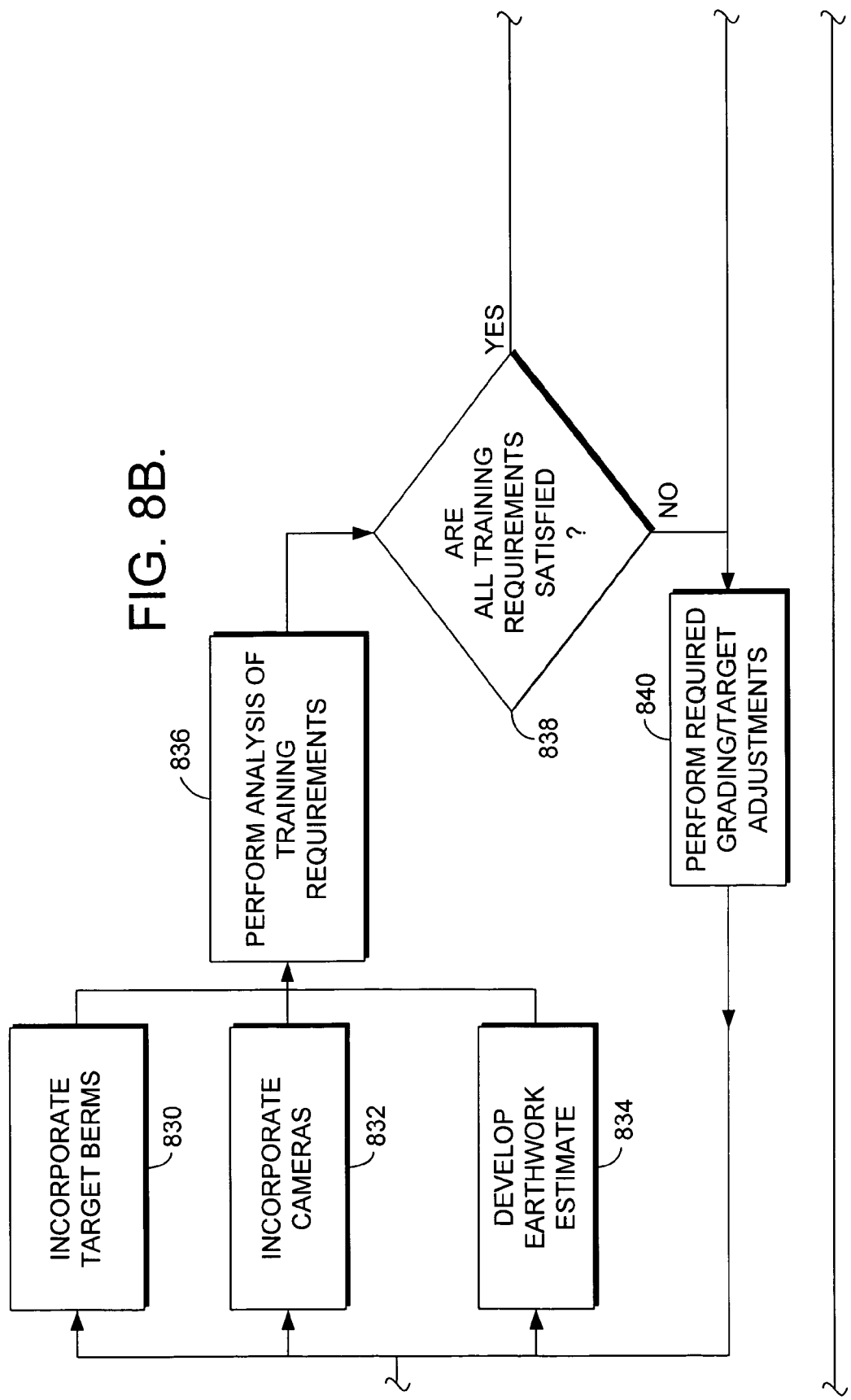
Figure 8C:
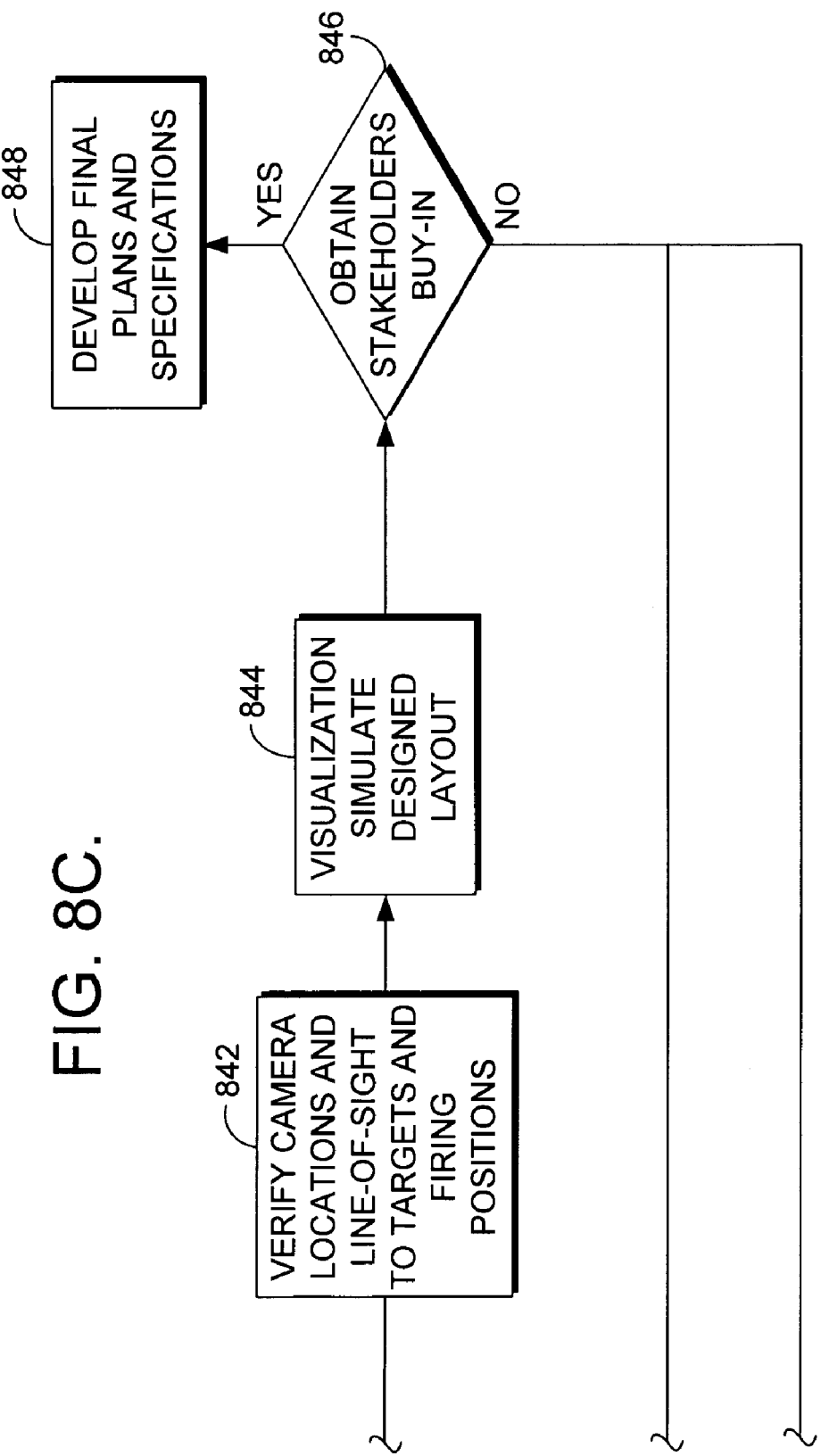

Turning now to FIGS. 8A-8C, a flow diagram is illustrated which shows a method 800 for gunnery training facility design in accordance with an embodiment of the present invention. As previously discussed with regard to urban and small arms training facility design, for training facility design to commence, information pertinent to the training facility being designed must first be obtained. With respect to gunnery training facilities, such information may include, without limitation, topographical and/or survey data from the parcel of land on which the training facility is to be located (as indicated at block 802 of FIG. 8A), an existing digital terrain model of the parcel of land on which the training facility is to be located (as indicated at block 804), any project-specific training requirements (as indicated at block 806), a desired target matrix (as indicated at block 808), information pertaining to any applicable environmental constraints (as indicated at block 812), any project-specific design criteria (as indicated at block 814), and any existing property information and SDZ constraint information (as indicated at block 816). Additionally, any line-of-sight constraints (e.g., view angles, berm clearances, and the like) may be identified, as indicated at block 810. Subsequently, if available, a range template from a template library is applied to the existing digital terrain model, as indicated at block 818. It will be understood and appreciated by those of ordinary skill in the art that if a range template is not available for the gunnery training facility being designed, a range template may be created. Such variation is contemplated to be within the scope of the present invention.

Alternatively, information pertaining to individual targets, firing points and other range geometry may be manually input with respect to the existing terrain. This is indicated at block 819.

Once the range template has been applied to the existing digital terrain model (or information has been manually input with respect to the existing terrain, it is determined whether the surface danger zone (SDZ) is encroaching the range, as indicated at block 820. If the SDZ is encroaching, the process may return to the step indicated at block 818 and the range template may be applied to the existing digital terrain model at a different location or orientation, after which it is again determined whether the SDZ is encroaching.

Once it is determined that the SDZ is not encroaching, targets that are present on the range template may be adjusted based upon the identified line-of-sight and environmental constraints. This is indicated at block 822. Additionally, targets that are present on the range template may be adjusted to minimize earthwork requirements, as indicated at block 824. Subsequently, analysis of the training requirements may be performed based upon catalogs and summaries, as indicated at block 826. During this analysis, line-of-sight is checked to verify that all targets are at a reasonable place.

Subsequently, as indicated at block 828, it is determined whether all the training requirements obtained at block 806 are satisfied. To determine if all training requirements are satisfied, offensive and defensive analyses are run to determine if all range objectives are satisfied. By way of example only, a gunnery range objective may include having a certain number of targets which are capable of being fired upon within a given time frame. If all training requirements are satisfied, the process may proceed to the step indicated at block 830 of FIG. 8B, which step is more fully described below. However, if one or more training requirements is not satisfied, a report/summary is output which contains information from which a user may determine which training requirements are not met. This is indicated at block 829. Subsequently, targets may again be adjusted, as indicated at blocks 822 and 824. Subsequently, analysis of the training requirements is again performed, as hereinabove described (and as indicated at block 826), and it is again determined whether all training requirements are satisfied, as indicated at block 828. Again, if not all training requirements are satisfied, the process returns to step 829 until a positive answer to the question present in block 828 is obtained.

Once all training requirements are satisfied, target berms may be incorporated into the digital terrain model, as indicated at block 830. Berm incorporation was discussed hereinabove with reference to FIGS. 14 and 15. Additionally, if desired, cameras may be incorporated into the digital terrain model, as indicated at block 832. Simultaneously or sequentially, an earthwork estimate may be developed to determine the amount of earthwork that will be necessary to construct the small arms training facility being designed. The earthwork estimate will identify the amount of soil or rock that will need to be removed or added depending on the design in order to implement the training facility. This is indicated at block 834. Next, analysis of the training requirements may be performed, as indicated at block 836. During this analysis, line-of-sight is again checked to verify that all targets are at a reasonable place. Subsequently, it is again determined whether all training requirements obtained at block 806 of FIG. 8A have been satisfied. This is indicated at block 838. If all training requirements have not been met, grading and/or target adjustments may be performed, as indicated at block 840. Once the grading and/or target adjustments have been made, the process may return to the steps indicated at blocks 830, 832, and 834, as necessary, and an analysis of the training requirements may again be performed (as indicated at block 836).

Once a positive answer to the question presented at block 838 is obtained, the process may proceed to a final design phase shown in FIG. 8C wherein camera locations and line-of-sight to the various targets and firing positions is verified. This is indicated at block 842. Subsequently, the designed layout may be simulated using, for example, CAD and/or a three-dimensional simulation tool. This is indicated at block 844. Next, a stakeholder buy-in is obtained, as indicated at block 846. If the stakeholders determine that they do not wish to buy into the designed small arms training facility, the process may return to the step indicated at block 818 and the range template may be applied to the digital terrain model obtained in the step indicated at block 804 at a different location or orientation, or the process may return to the step indicated at block 840 and grading and/or target adjustments may be performed. If, however, the stakeholders determine that they do wish to buy into the designed small arms training facility, final plans and specifications may be developed, as indicated at block 848.

Figure 9B:
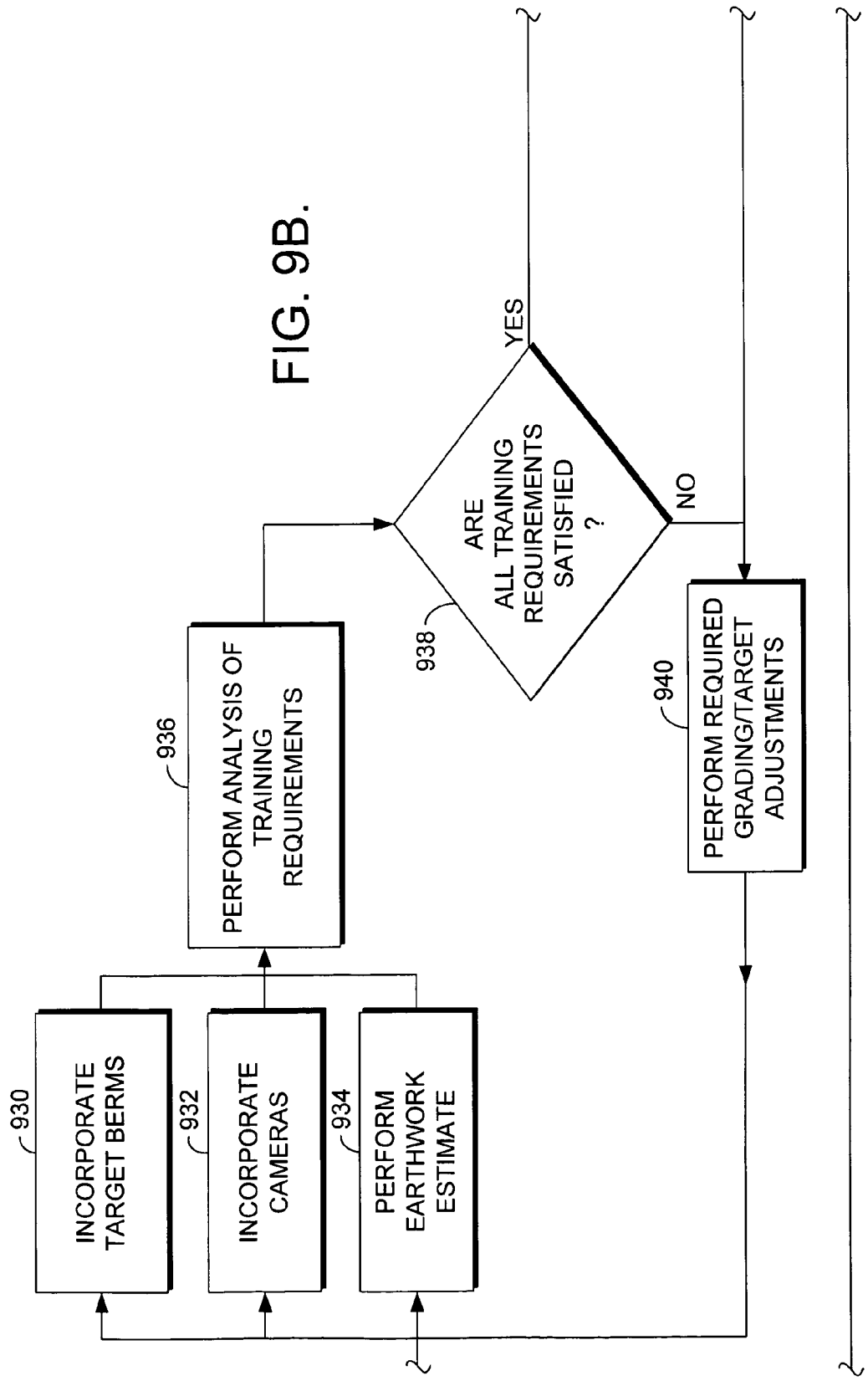
Figure 9C:
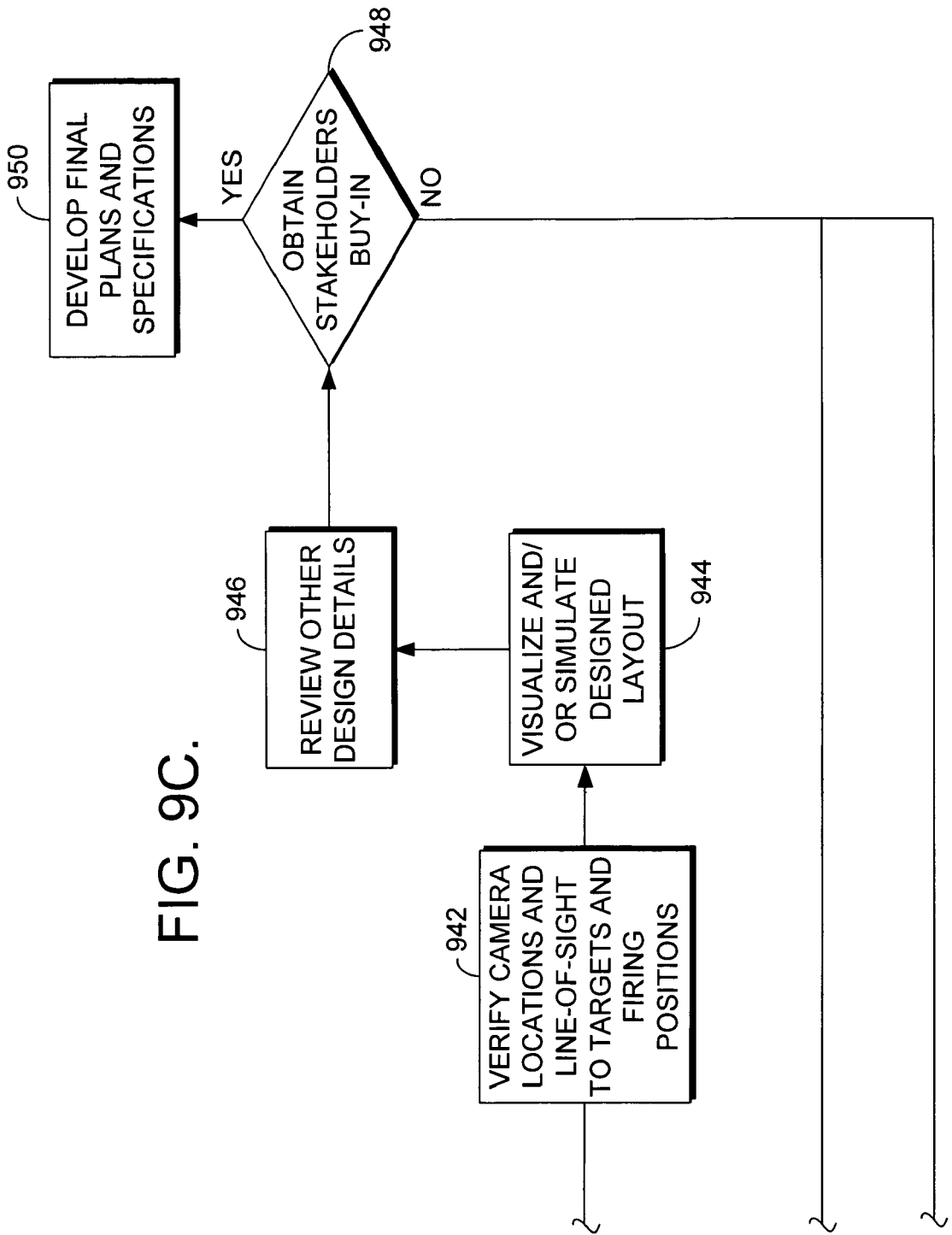

Turning now to FIGS. 9A-9C, a flow diagram is illustrated which shows a method 900 for objective-based training facility design in accordance with an embodiment of the present invention. As previously discussed with regard to urban, small arms, and gunnery training facility design, for training facility design to commence, information pertinent to the training facility being planned must first be obtained. With respect to objective-based training facilities, such information may include, without limitation, topographical and/or survey data from the parcel of land on which the training facility is to be located (as indicated at block 902 of FIG. 9A), an existing digital terrain model of the parcel of land on which the training facility is to be located (as indicated at block 904), project-specific training requirements (as indicated at block 906), information pertaining to any applicable environmental constraints (as indicated at block 910), any existing property information and SDZ constraint information (as indicated at block 912), and any project-specific design criteria (as indicated at block 914). Additionally, any line-of-sight constraints, e.g., view angles, berm clearances, and the like, may be identified, as indicated at block 908. Subsequently, objectives necessary for the various "stations" of the training facility being planned may be identified based upon the project-specific design criteria. This is indicated at block 916.

Subsequently, if available, an objective range template from a template library is applied to the existing digital terrain model, as indicated at block 918. It will be understood and appreciated by those of ordinary skill in the art that if an objective range template is not available for the objective-based training facility being designed, a range template may be created. Such variation is contemplated to be within the scope of the present invention.

Alternatively, information pertaining to individual targets, firing points and other range geometry may be manually input with respect to the existing terrain. This is indicated at block 919.

Once the range template has been applied to the existing digital terrain model (or information has been manually input with respect to the existing terrain, it is determined whether the SDZ is encroaching the range, as indicated at block 920. If the SDZ is encroaching, the process may return to the step indicated at block 918 and the individual objective templates may be applied to the existing digital terrain model at different locations or orientations. Subseqeuntly, it is again determined whether the SDZ is encroaching.

Once it is determined that the SDZ is not encroaching, the objective locations and orientations may be adjusted as desired or necessary. This is indicated at block 922. Additionally, targets within the objectives may be adjusted based upon the identified line-of-sight and environmental constraints, as indicated at block 924. Subsequently, analysis of the training requirements may be performed, as indicated at block 926.

Subsequently, as indicated at block 928, it is determined whether all the training requirements obtained at block 906 are satisfied. If all training requirements are satisfied, the process may proceed to the step indicated at block 930 of FIG. 9B, which step is more fully described below. However, if one or more training requirements are not satisfied, a report/summary is output which contains information from which a user may determine which training requirements are not met. This is indicated at block 929. Subsequently, objective locations and orientations may again be adjusted, as indicated at block 922, and targets may again be adjusted, as indicated at block 924. Subsequently, analysis of the training requirements is again performed, as hereinabove described (and as indicated at block 926), and it is again determined whether all training requirements are satisfied, as indicated at block 928. Again, if not all training requirements are satisfied, the process returns to step 929 until a positive answer to the question presented in block 928 may be obtained.

Once all training requirements are satisfied, target berms may be incorporated into the digital terrain model, as indicated at block 930. Berm incorporation was discussed hereinabove with reference to FIGS. 14 and 15. Additionally, if desired, cameras may be incorporated into the digital terrain model, as indicated at block 932. Simultaneously or sequentially, an earthwork estimate may be performed to determine the amount of earthwork that will be necessary to construct the small arms training facility being designed. This is indicated at block 934. Next, analysis of the training requirements may be performed, as indicated at block 936. Subsequently, it is again determined whether all training requirements obtained at block 906 have been satisfied. This is indicated at block 938. If all training requirements have not been satisfied, grading and/or target adjustments may be performed, as indicated at block 940. Once the grading and/or target adjustments have been made, the process may return to the steps indicated at blocks 930, 932, and 934, as necessary, and an analysis of the training requirements may again be performed (as indicated at block 936).

Once a positive answer to the question presented in block 938 is obtained, the process may proceed to a final design phase shown in FIG. 9C wherein camera locations and line-of-sight to the various targets and firing positions is verified. This is indicated at block 942. Subsequently, the designed layout may be simulated using, for example, CAD and/or a three-dimensional simulation tool. This is indicated at block 944. Next, any additional design details are reviewed, as indicated at block 946, and a stakeholder buy-in is obtained, as indicated at block 948. If the stakeholders determine that they do not wish to buy into the designed objective-based training facility, the process may return to the step indicated at block 918 and the individual objective templates may be applied to the digital terrain model obtained in the step indicated at block 904 at different locations or orientations, or the process may return to the step indicated at block 940 and grading and/or target adjustments may be made. If, however, the stakeholders determine that they do wish to buy into the designed small arms training facility, final plans and specifications may be developed, as indicated at block 950.

Figure 10A:
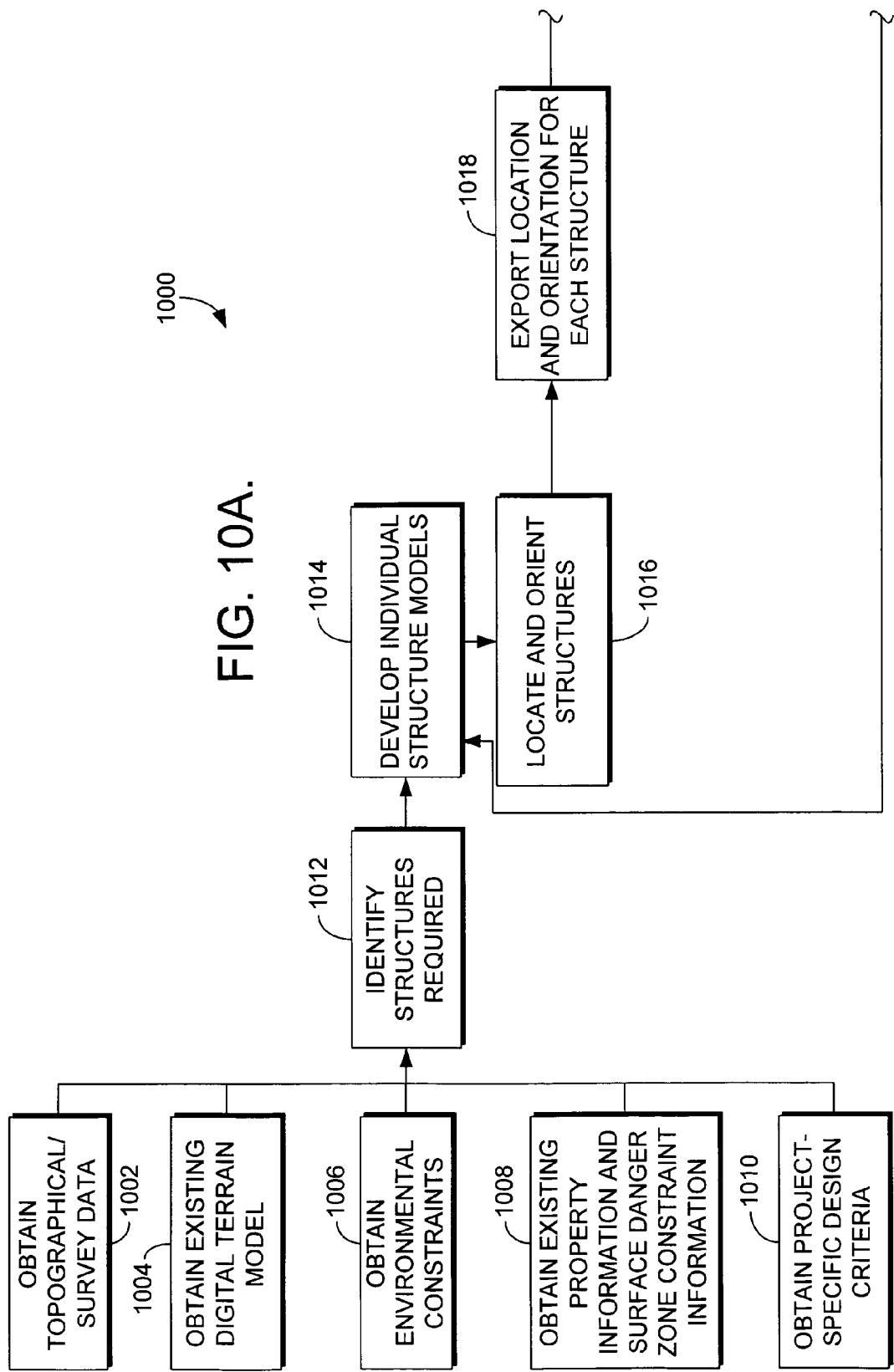
Figure 10B:
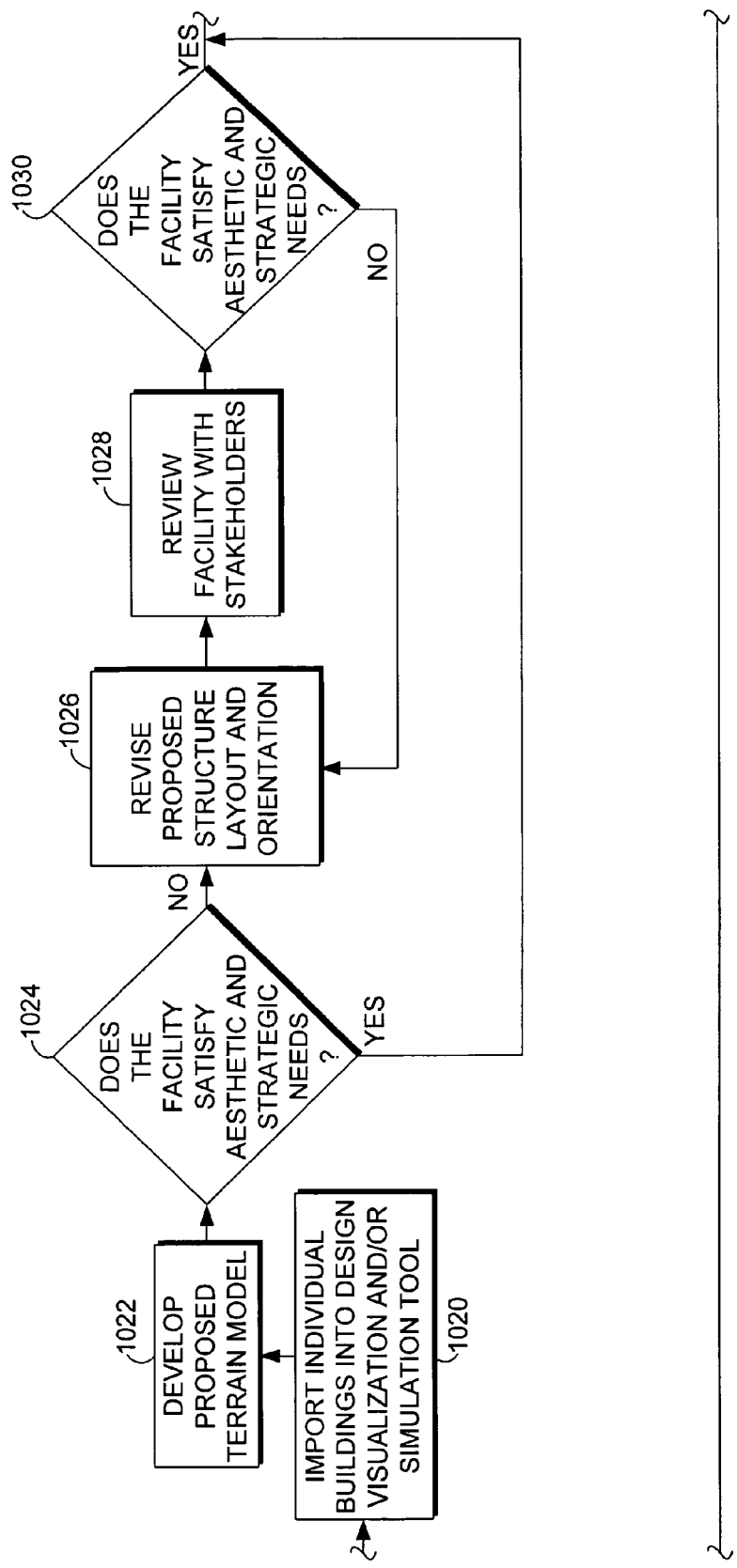

Referring back to FIG. 1A, if it is determined in the step indicated at block 110 that the appropriate project development milestone for the training facility in question is training facility review, and it is determined that the type of training facility being reviewed is an urban training facility, the process illustrated in FIGS. 10A-10C may be commenced. With reference to FIGS. 10A-10C, a flow diagram is illustrated which shows a method 1000 for urban training facility review in accordance with an embodiment of the present invention. It should be noted that the method 1000 of FIGS. 10A-10C is identical to the method 200 of FIGS. 2A-2C wherein urban training facility planning is illustrated (and was hereinabove described). If the urban training facility in question has been planned and designed in accordance with embodiments of the present invention (as hereinabove described with reference to FIGS. 2 and 6), the process may proceed to training facility construction and operations as indicated at blocks 118 and 120 of FIG. 1A. If, however, the training facility in question was planned and/or designed by processes other than those herein described, training facility review (or at least portions thereof) will likely be desired prior to proceeding to construction and operations.

As will be understood and appreciated by those of ordinary skill in the art, for training facility review to commence, information pertinent to the training facility being reviewed must first be obtained. Such information may include, without limitation, topographical and/or survey data from the parcel of land on which the training facility is to be located (as indicated at block 1002 of FIG. 10A), an existing digital terrain model of the parcel of land on which the training facility is to be located (as indicated at block 1004), information pertaining to any applicable environmental constraints (as indicated at block 1006), any existing property information and SDZ constraint information (as indicated at block 1008), and project-specific design criteria (as indicated at block 1010). Subsequently, taking all of the information obtained into account, any structures necessary for the urban training facility being reviewed are identified, as indicated at block 1012.

Once the necessary structures have been identified, a structure model is developed for each individual structure identified in the step indicated at block 1012. This is shown at block 1014. A location and orientation for each of the structures is subsequently determined, as indicated at block 1016, and such information is subsequently exported as indicated at block 1018. The individual structure models, as well as the corresponding locations and orientations, are subsequently imported into a design visualization and/or simulation tool, as indicated at block 1020 of FIG. 10B. Subsequently, a proposed terrain model is developed in accordance with the visualized and/or simulated design. This is indicated at block 1022.

Subsequently, as indicated at block 1024, the person/entity reviewing the urban training facility and any interested stakeholders collaborate with one another to determine whether the training facility represented in the visualization and/or simulation tool satisfies the aesthetic and/or strategic requirements set forth in the design criteria for the urban training facility being reviewed, such design criteria being obtained in the step indicated at block 1010. If it does, the process may proceed to the step indicated at block 1032 of FIG. 10C, which step is more fully described below. However, if the proposed training facility does not satisfy the aesthetic and/or strategic requirements and adjustments are deemed to be necessary, such adjustments are made and the proposed structure layout and orientation are revised, as indicated at block 1026. Such revision generally involves adjusting the location and/or orientation of one or more structures to satisfy aesthetic and/or strategic requirements. Subsequently, the revised training facility is reviewed by the designing person/entity and any interested stakeholders, as indicated at block 1028, and it is determined whether the urban training facility represented satisfies the aesthetic and/or strategic requirements set forth in the design criteria for the urban training facility being designed. This is indicated at block 1030. If it does not, adjustments are made and the process returns to the step indicated at block 1026 and the terrain model is again revised with an effort toward ensuring that the model satisfies aesthetic and/or strategic requirements for the urban training facility being designed.

Once the aesthetic and/or strategic requirements are satisfied for the urban training facility being reviewed, the site layout, materials, facades, and the like are reviewed, as indicated at block 1032 of FIG. 10C. Upon completing this review, it is determined whether the training facility represented replicates the desired training environment. This is indicated at block 1034. If it does, the process may proceed to the step indicated at block 1050, which step is more fully described below. If it does not, one or more components within the training facility environment may be adjusted to obtain a realistic environment. This is indicated at block 1036. Once any component adjustments have been made, the site layout, materials, facades, and the like are again reviewed (as indicated at block 1032) and a determination is again made regarding whether the urban training facility in question replicates the desired training environment (as indicated at block 1034).

Simultaneously or sequentially with respect to the site layout review, training requirements for the urban training facility being reviewed are assessed, as indicated at block 1038. Assessment of the training requirements involves first developing a three-dimensional digital terrain model of the facility being reviewed. This is indicated at block 1040. Subsequently, using the three-dimensional digital terrain model, shadow analysis of the training facility modeled thereby is performed, as indicated at block 1042. As previously discussed, shadow analysis generally permits the identification of areas of threat from individual firing positions within the planed training facility by developing a plane of areas that are obscure to each firing position due to obstructions within the training facility undergoing review.

Utilizing the results of the shadow analysis, it is subsequently determined whether or not all training requirements for the urban training facility being reviewed are satisfied, as indicated at block 1044. If all training requirements are not satisfied, the individual/entity reviewing the training facility, as well as any interested stakeholders, may collaborate to determine what adjustments to the structure locations and/or orientations must be made for the training requirements to be satisfied. This is indicated at block 1046. Subsequently, any adjustments determined to be necessary are made to the proposed training facility and the proposed terrain model is adjusted. This is indicated at block 1048. Subsequently, the process returns to the step indicated at block 1038, this time with the training requirement assessment, three-dimensional digital terrain model development and shadow analysis all being performed with respect to the adjusted training facility. Alternatively, upon determining that adjustments to the proposed training facility are necessary, the process may return to the step indicated at block 1014 of FIG. 10A and new structure models may be developed. This alternative is likely to be utilized in those circumstances where severe adjustments are necessary for the training requirements to be satisfied.

Once all training requirements are met and the urban training facility under review replicates the desired training environment, the process may proceed to the design phase or the construction phase, as indicated at block 1050. Urban training facility design was discussed hereinabove with reference to FIGS. 6A-6C.

Figure 11A:
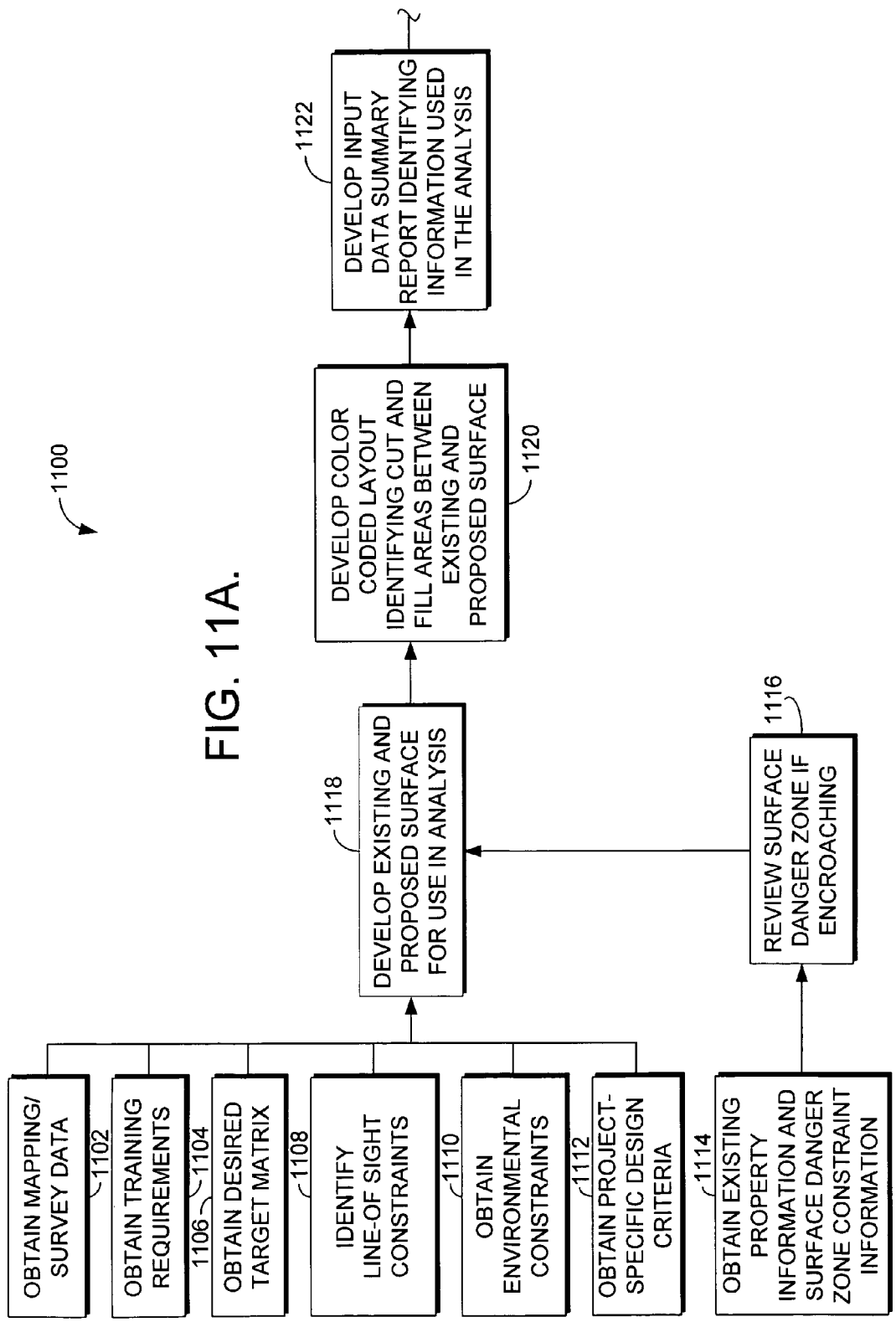
FIGS. 11A through 11C illustrate a flow diagram representative of a method for reviewing a mounted or dismounted gunnery training facility or an objective-based training facility in accordance with an embodiment of the present invention.
Figure 11B:
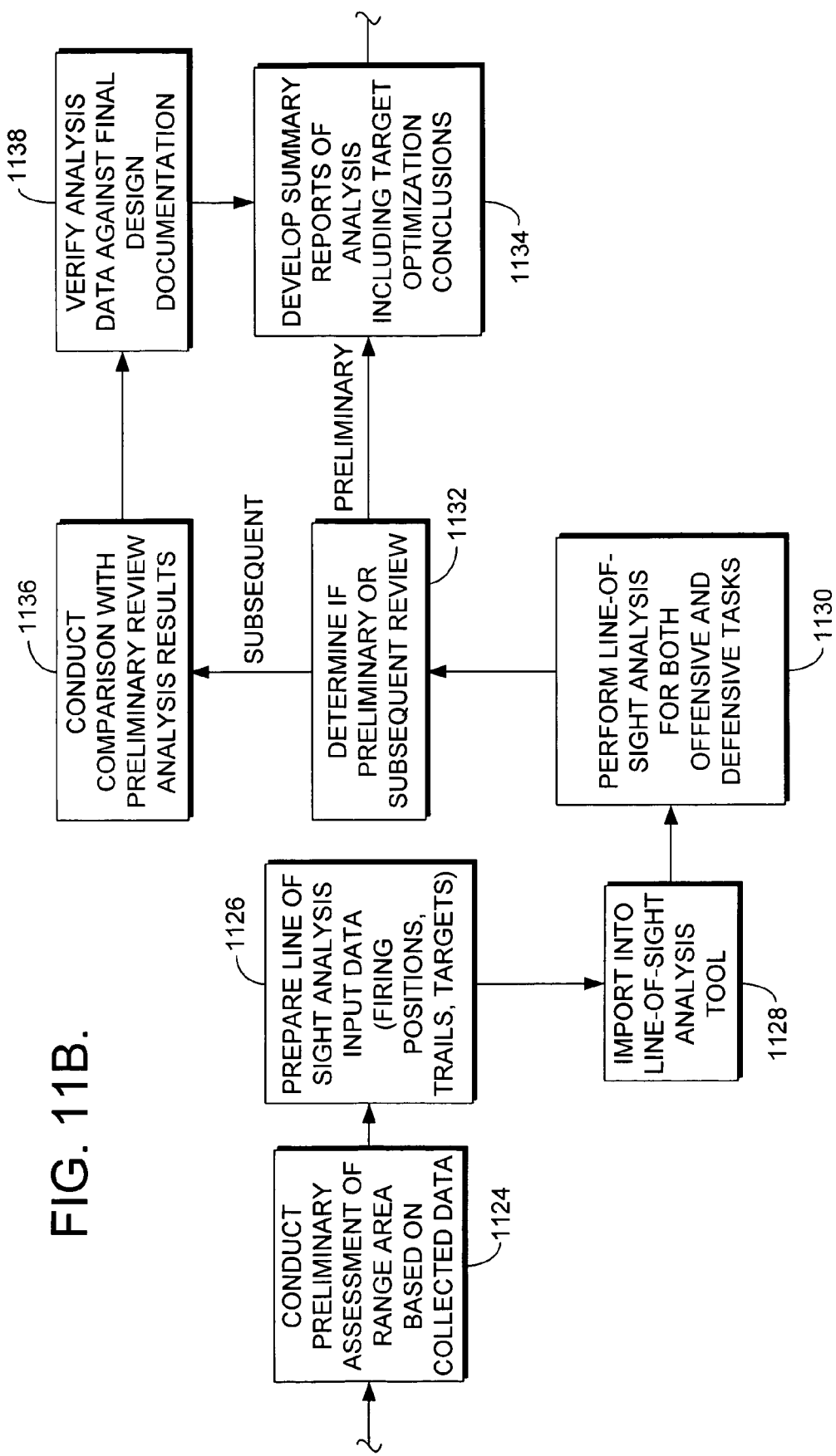
Figure 11C:
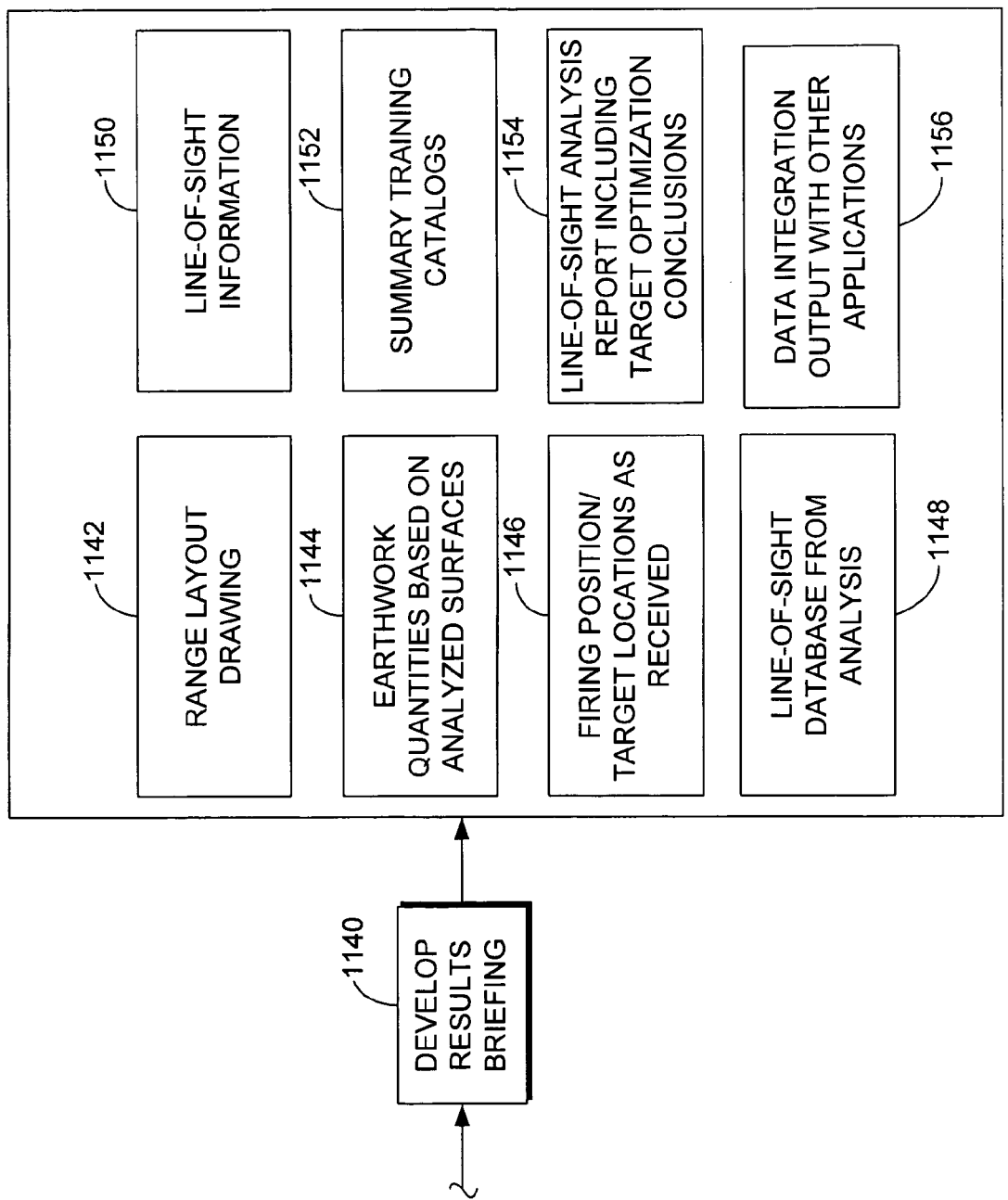

Referring back to FIG. 1A, if it is determined in the step indicated at block 110 that the appropriate project development milestone for the training facility in question is training facility review, and it is determined that the type of training facility being reviewed is an gunnery or objective-based training facility, the process illustrated in FIGS. 11A-11C may be commenced. With reference to FIGS. 11A-11C, a flow diagram is illustrated which shows a method 1100 for gunnery and/or objective-based training facility review in accordance with an embodiment of the present invention. Review of a training facility may take place at a preliminary stage in the design process or as a subsequent review prior to commencing construction on the training facility in question. The review processes for these two different phases of the process are similar and, accordingly, the steps discussed hereinbelow with respect to FIGS. 11A-11C may be applied at either stage. Any significant differences will be particularly mentioned, as applicable.

As will be understood and appreciated by those of ordinary skill in the art, for gunnery and/or objective-based training facility review to commence, information pertinent to the training facility being reviewed must first be obtained. Such information may include, without limitation, topographical and/or survey data from the parcel of land on which the training facility is to be located (as indicated at block 1102 of FIG. 11A), project-specific training requirements (as indicated at block 1104), a desired target matrix (as indicated at block 1106), information pertaining to any applicable environmental constraints (as indicated at block 1110), and any project-specific design criteria (as indicated at block 1112). Project-specific design criteria may include, by way of example only, trails/roads geometry, targets, firing positions, and preliminary design plans (if at a preliminary design stage) or subsequent design plans (if at a subsequent design stage). Further, for each training table required in the project-specific training requirements (obtained at block 1104), information should include proposed tasks to be trained, maneuver box locations and proposed targets.

Additionally, any existing property information and SDZ constraint information, e.g., safety markers, and the like, may be obtained, as indicated at block 1114, followed by a review thereof to determine if the SDZ is encroaching, as indicated at block 1116. In addition, any line-of-sight constraints, e.g., view angles, berm clearances, and the like, may be identified, as indicated at block 1108.

Subsequently, existing and proposed triangulated surfaces to be used in the line-of-sight analysis which follows is developed, as indicated at block 1118. Subsequently, a color-coded layout identifying cut and fill areas between existing and proposed surfaces is developed, as indicated at block 1120. Next, as indicated at block 1122, an input data summary report identifying information to be used for the subsequent review is developed. In one embodiment, the input data summary lists data not available as well as accuracy limitations.

Next, with reference to FIG. 11B, a preliminary assessment of the range area based upon the collected data is conducted, as indicated at block 1124. Thereafter, input data for the line-of-sight analysis is prepared including, without limitation, firing positions trails, and targets (moving and static). This is indicated at block 1126. This information is subsequently input into a line-of-sight analysis tool, as indicated at block 1128, and a line-of-sight analysis is conducted for both offensive and defensive tasks utilizing the methods hereinabove described with reference to FIG. 15. This is indicated at block 1130. In one embodiment, the line-of-sight analysis may be conducted for up to three training scenarios. Such scenarios may be defined as view angle alternatives, buffers, training tables, firing heights, and the like.

It is subsequently determined whether the stage at which the review is taking place is a preliminary review stage or a final review stage. This is indicated at block 1132. If it is a preliminary review stage, summary reports of analysis including target optimization conclusions are prepared, as indicated at block 1134. However, if it is a subsequent review stage (which indicates that a preliminary review has been previously completed at an earlier stage of development), a comparison of the preliminary review analysis results is conducted, as indicated at block 1136, and the analysis data provided is verified against the final design documentation provided. This is indicated at block 1138. Subsequently, reports of analysis including target optimization conclusions are developed, as indicated at block 1134.

Regardless of the stage at which the review is taking place, once the summary reports of analysis have been developed, a results briefing is prepared, as indicated at block 1140 of FIG. 11C. The results briefing may include a number of analysis deliverables. By way of example only, and not limitation, one or more range layout drawings including color-coded cut and fill locations from the proposed surface, firing positions, trails, and targets, and existing and proposed contours may be provided, as indicated at block 1142. Additionally, earthwork quantities based on the analyzed surfaces may be provided, as indicated at block 1144, as may the received firing position/target locations data, as indicated at block 1146. Further, a line-of-sight database indicating line-of-sight analysis results and parameters from the analysis may be provided, as indicated at block 1148, in addition to line-of-sight information including, without limitation, firing points, static targets, mover analysis points, availability line-of-sight geometry lines, as indicated at block 1150. Summary training catalogs based on standard training tables or supplied requirements and a line-of-sight analysis summary report including target optimization conclusions may also be provided, as indicated at blocks 1152 and 1154, respectively. Additionally, data integration output for use with other applications may be provided, as indicated at block 1156. A method of generating summary training catalogs in accordance with an embodiment of the present invention is illustrated in FIG. 16.

Figure 16:
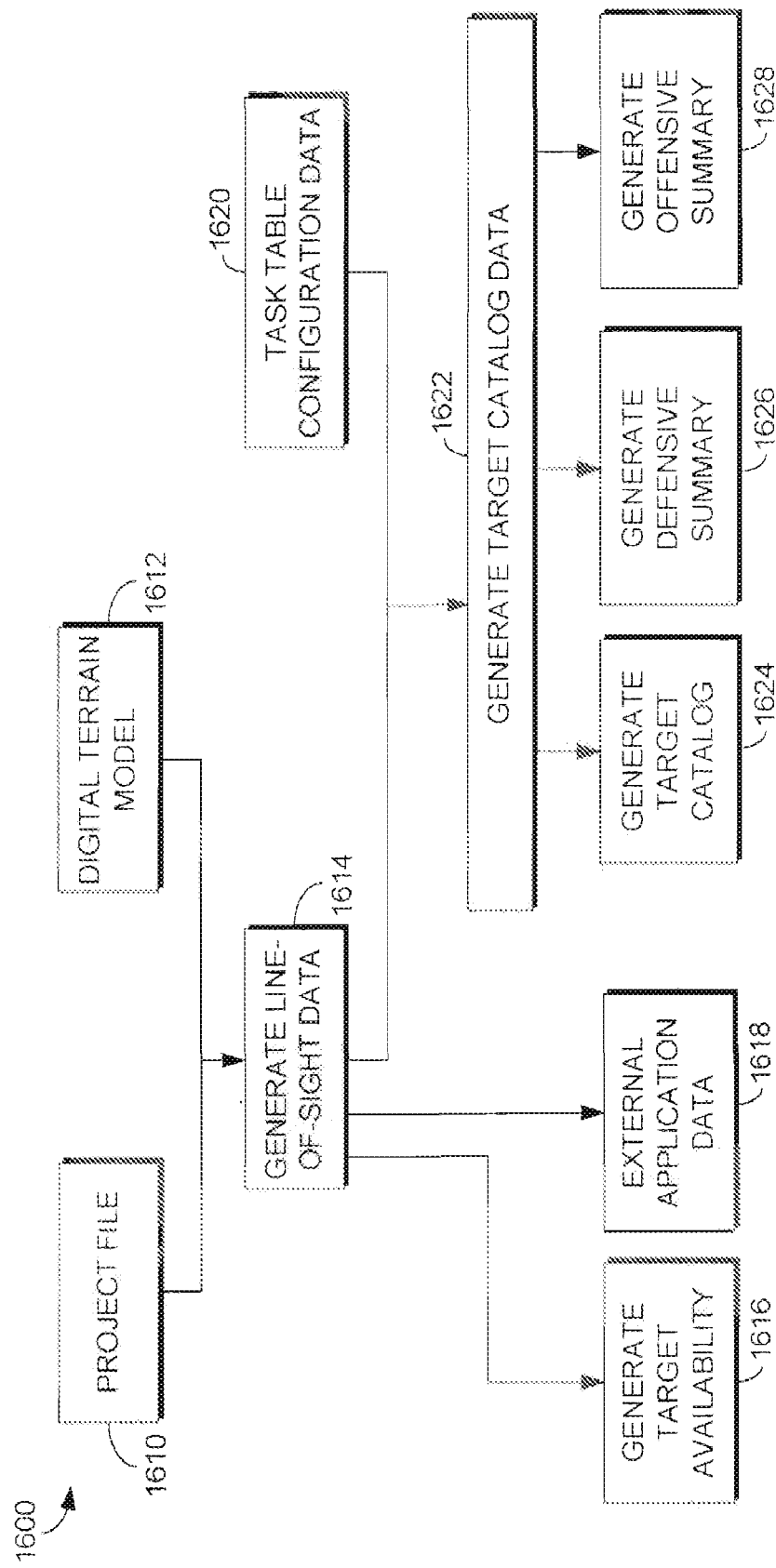
FIG. 16 illustrates a flow diagram representative of a method for generating target catalogs in accordance with an embodiment of the present invention.

With reference to FIG. 16, a method for generating summary training catalogs in accordance with an embodiment of the present invention is illustrated and designated generally as reference numeral 1600. Initially, as indicated at blocks 1610 and 1612, respectively, a project file containing the range geometry, as well as a digital terrain model are input or retrieved. Subsequently, line-of-sight data is generated, as indicated at block 1614. The line-of-sight data may subsequently be utilized to generate information pertaining to target availability, as indicated at block 1616. By way of example only, such target availability information may be printed or output as a PDF or text file. Additionally, the line-of-sight data may be utilized to generate data compatible with external applications (e.g., desktop applications), as indicated at block 1618. Such data may be presented as, by way of example only, a text file or an XML file.

In addition, the line-of-sight data generated, as well as task table configuration data (as indicated at block 1620) may be output to generate target catalog data. This is indicated at block 1622. Subsequently, one or more target catalogs may be output, as indicated at block 1624. By way of example only, such target catalogs may be printed or output as a PDF or text file. Additionally, defensive and offensive summaries may be output from the target catalog data, as indicated at blocks 1626 and 1628, respectively.

Referring back to FIG. 1A, if it is determined in the step indicated at block 110 that the appropriate project development milestone of the training facility in question is training facility construction, the system and method of the present invention may be utilized to provide construction information which can be used by survey equipment for staking, to re-evaluate line-of-sight as a result of field changes, to validate line-of-sight, and to create an as-built line-of-sight analysis and simulation. Each of these functions was hereinabove described with regard to one or more of the planning, design and review milestones and, accordingly, is not further described herein.

Figure 1A:
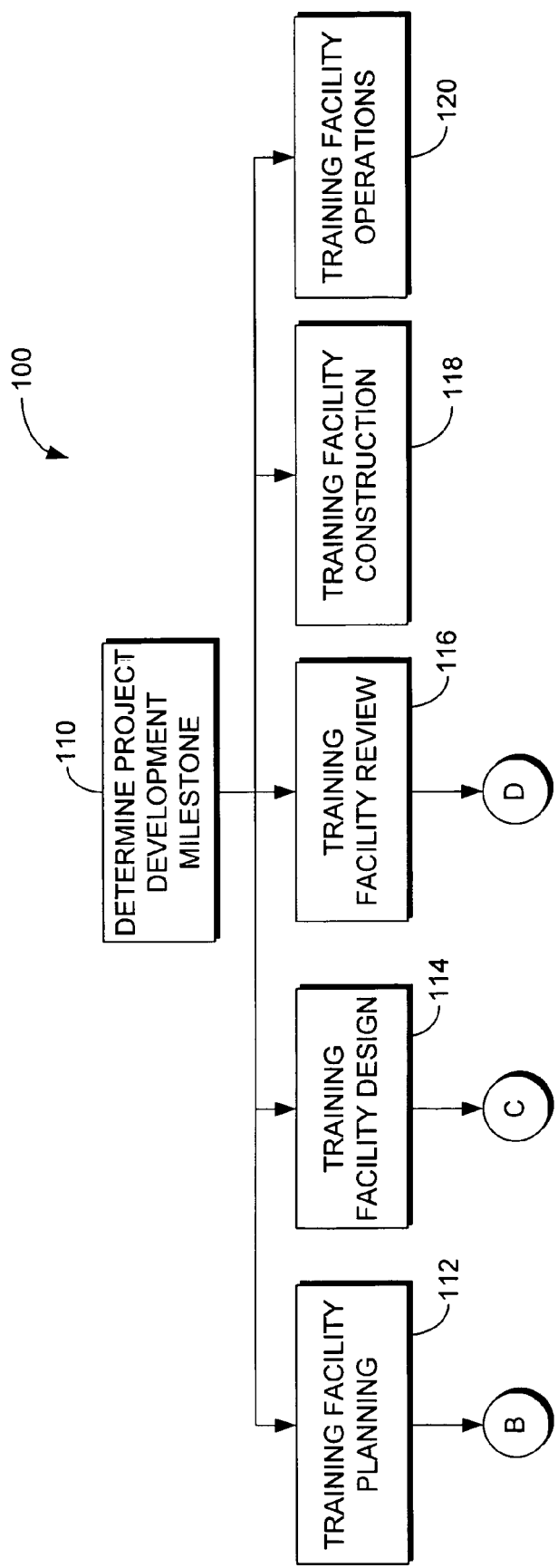
Figure 1B:
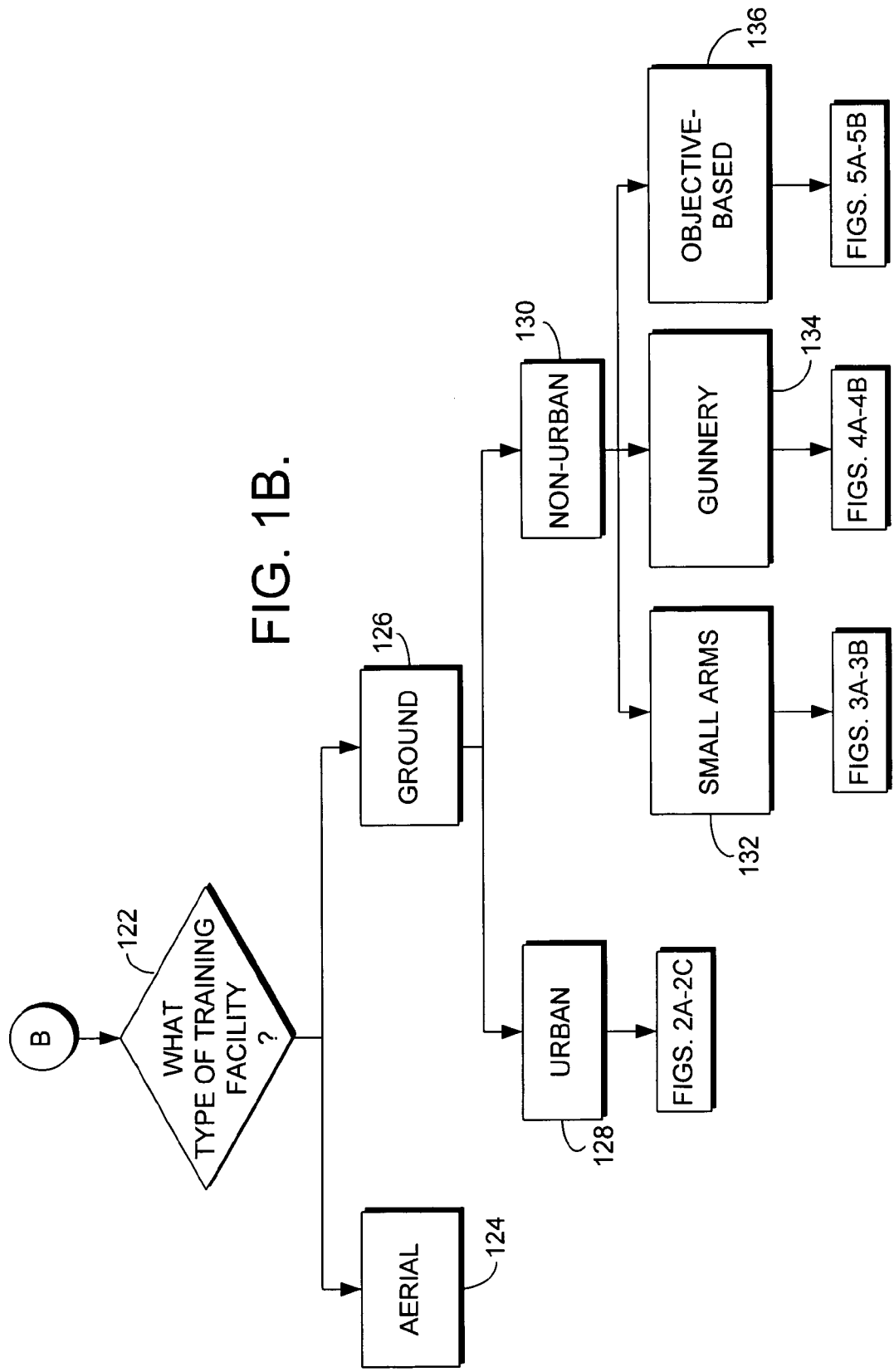
Figure 1C:
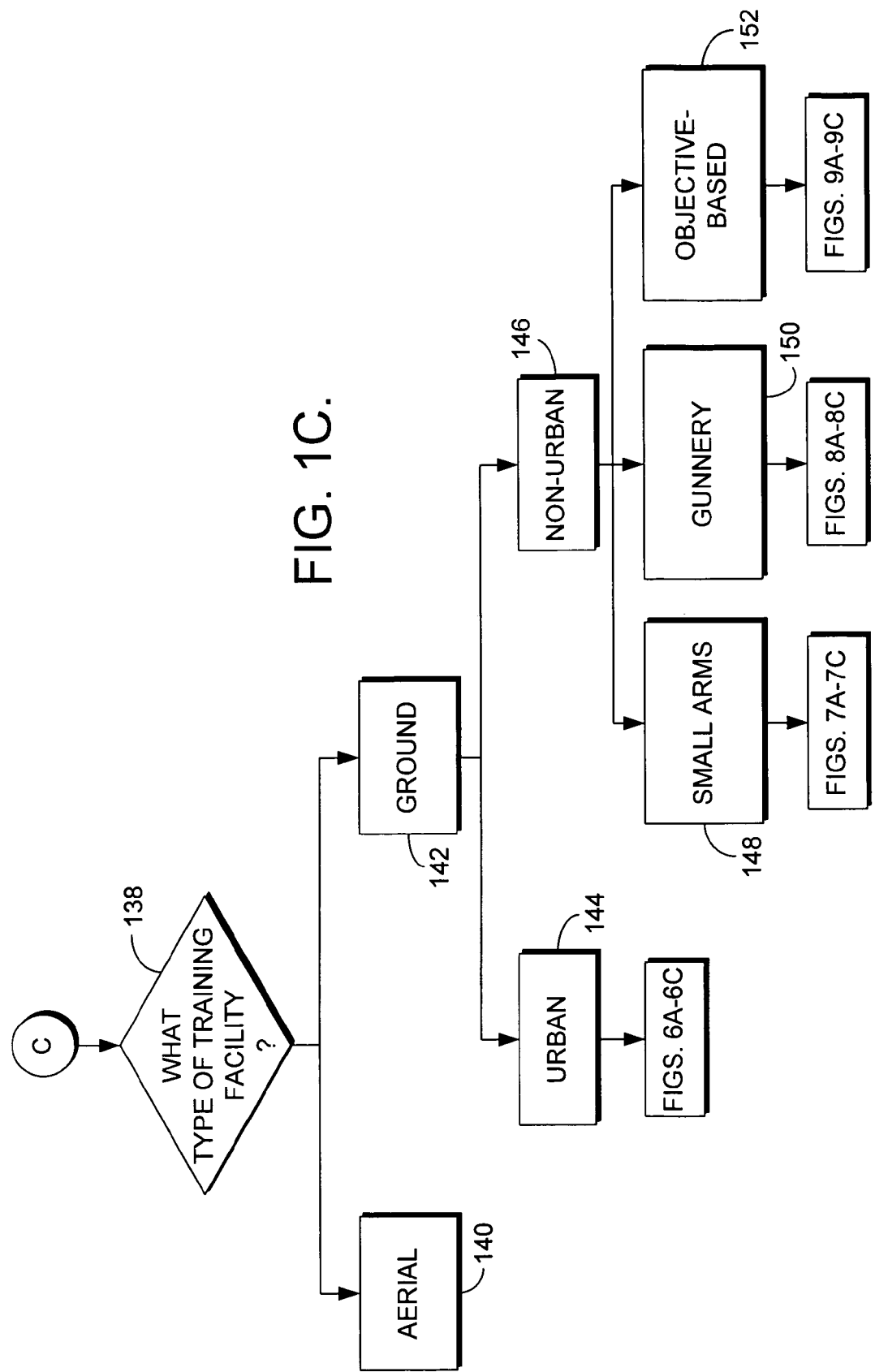

If it is determined in the step indicated at block 110 of FIG. 1A that the appropriate development milestone of the training facility in question is training facility operations, the system and method of the present invention may be utilized to support such operations. The design visualization and/or simulation tool may be applied to both new facilities and existing facilities. The line-of-sight database, target availability and digital terrain models may be used in conjunction with this tool for use in pre-training instruction, scenario building and after-action review sessions. Further, the method and system of the present invention may be utilized to optimize firing box locations for offensive engagements on gunnery training facilities. This application can be applied at the design stage or implemented on existing ranges to assess training capabilities of a facility based upon training requirements. Additionally, the design data may be integrated into existing applications to aid in asset management and maintenance scheduling.

As can be understood, in various embodiments, the present invention provides a method and system for implementing a training facility throughout various phases including a planning phase, a design phase, a review phase, a construction phase, and an operations phase. In various embodiments, the method and system of the present invention may incorporate one or more of line-of-sight analysis, berm incorporation, and design visualization and/or simulation, including operations and training.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. Computer-storage media having embodied thereon computer-useable instructions for performing a method for designing a training facility for a geographic location having at least one proposed observer position and at least one proposed target position, the method comprising:
    receiving design data indicative of the geographic location;
    receiving data indicative of the at least one proposed observer position;
    receiving data indicative of the at least one proposed target position;
    applying the data indicative of the at least one proposed observer position and the at least one proposed target position to the design data creating modified design data; and
    conducting a line-of-sight analysis of the modified design data between the at least one proposed observer position and the at least one proposed target position at one or more of a training facility planning phase, a training facility design phase, and a training facility review phase, wherein the line-of-sight analysis includes constraints other than visibility of the at least one proposed target position from the at least one proposed observer position.

2. The media of claim 1, wherein the method further comprises importing the modified design data into a design visualization tool at one or more of the training facility planning phase, the training facility design phase, and the training facility review phase.

3. The media of claim 1, wherein the at least one proposed observer position comprises a firing position.

4. Computer-storage media having computer-executable instructions embodied thereon that, when executed, perform a method for planning a training facility for a geographic location having at least one observer position and at least one target position, the method comprising:
    receiving geographic data that describes the geographic location;
    receiving observer data that indicates the at least one observer position;
    receiving template data, wherein the template data describes a template that includes the at least one target position with respect to the template;
    applying the template data to the geographic data at a position of the template with respect to the geographic location;
    determining whether a first constraint is violated due to the position of the template;
    when the first constraint is exceeded, applying the template data to the geographic data at one or more other positions of the template with respect to the geographic location until it is determined that the first constraint is not exceeded;

when the first constraint is not exceeded, determining whether the at least one target position is viewable from the at least one observer position;

when the target position is not viewable, adjusting the target position until the target position is viewable.

5. The media of claim 4, wherein the training facility is one of an aerial training facility and a ground training facility.

6. The media of claim 5, wherein the training facility is a ground training facility selected from the group consisting of an urban training facility and a non-urban training facility.

7. The media of claim 6, wherein the training facility is a non-urban training facility selected from the group consisting of a small arms training facility, a gunnery training facility, and an objective-based training facility.

8. The media of claim 4, wherein the at least one observer position comprises a firing position.

9. The media of claim 6, wherein the training facility is an urban training facility and wherein the method further comprises identifying at least one structure to be incorporated into the urban training facility.

10. The media of claim 9, wherein the method further comprises:
developing a design model for the at least one structure;
receiving location and orientation information for the design model; and
importing the design model into the design visualization tool in accordance with the location and orientation information received.

11. The media of claim 7, wherein the training facility is an objective-based training facility, and wherein the method further comprises:
identifying one or more objectives;
applying data indicative of the one or more objectives to the modified design data; and
importing the modified design data having the one or more objectives applied thereto into the design visualization tool.

12. Computer-storage media having computer-useable instructions embodied thereon for performing a method for reviewing a training facility for a geographic location having at least one observer position and at least one target position, the method comprising:
receiving design data indicative of the geographic location;
receiving data indicative of the at least one observer position;
receiving data indicative of the at least one target position;
applying the data indicative of the at least one observer position and the at least one target position to the design data creating modified design data;
conducting a line-of-sight analysis of the modified design data between the at least one observer position and the at least one target position, wherein the line-of-sight analysis includes environmental criteria, crossing other targets, crossing other observer positions, and distance;
prioritizing results of the line-of-sight analysis; and
outputting results of the line-of-sight analysis.

13. The media of claim 12, wherein the training facility is one of an aerial training facility and a ground training facility.

14. The media of claim 13, wherein the training facility is a ground training facility selected from the group consisting of an urban training facility and a non-urban training facility.

15. The media of claim 14, wherein the training facility is a non-urban training facility selected from the group consisting of a small arms training facility, a gunnery training facility, and an objective-based training facility.

16. The media of claim 12, wherein the at least one observer position comprises a firing position.

17. The media of claim 14, wherein the training facility is an urban training facility, and wherein the method further comprises identifying at least one structure to be incorporated into the urban training facility.

18. The media of claim 17, wherein the method further comprises:
developing a design model for the at least one structure;
receiving location and orientation information for the design model; and
importing the design model into a design visualization tool in accordance with the location and orientation information received.

19. The media of claim 15, wherein the training facility is an objective-based training facility, and wherein the method further comprises:
identifying one or more objectives;
applying data indicative of the one or more objectives to the modified design data; and
importing the modified design data having the one or more objectives applied thereto into a design visualization tool.

20. Computer-storage media having computer-useable instructions embodied thereon for performing a method for line-of-sight analysis between a first position and a second position, the method comprising:
receiving design data representative of a geographic location;
receiving data indicative of the first position and data indicative of the second position;
generating a first path between the first position and the second position;
projecting the first path onto the design data to generate a first profile;
receiving at least one line-of-sight qualification related to other than visibility along the first path;
generating a second path by adjusting one or more of an elevation of the first position and an elevation of the second position in accordance with the at least one line-of-sight qualification received;
projecting the second path onto the design data to generate a second profile; and
determining a set of intersection points between the first profile and the second profile, the set of intersection points indicating portions of the geographic location represented by the design data which are obstructing line-of-sight between the first and second positions.

21. The media of claim 20, wherein the method further comprises generating surface modification guidelines indicative of modifications to be made to a surface represented by the design data for line-of-sight between the first and second positions to be achieved.

* * * * *